US011173963B2

(12) United States Patent
Matsuoka et al.

(10) Patent No.: US 11,173,963 B2
(45) Date of Patent: Nov. 16, 2021

(54) VEHICLE BODY FRONT STRUCTURE

(71) Applicant: HONDA MOTOR CO., LTD., Tokyo (JP)

(72) Inventors: Kiyohiko Matsuoka, Wako (JP); Takehiro Kondo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 16/617,648

(22) PCT Filed: May 9, 2018

(86) PCT No.: PCT/JP2018/017946
§ 371 (c)(1),
(2) Date: Nov. 27, 2019

(87) PCT Pub. No.: WO2018/221143
PCT Pub. Date: Dec. 6, 2018

(65) Prior Publication Data
US 2020/0114976 A1    Apr. 16, 2020

(30) Foreign Application Priority Data

Jun. 2, 2017    (JP) .............................. JP2017-109987

(51) Int. Cl.
*B62D 25/14*    (2006.01)
*B62D 21/15*    (2006.01)
(Continued)

(52) U.S. Cl.
CPC ........... *B62D 25/14* (2013.01); *B62D 21/152* (2013.01); *B62D 25/081* (2013.01);
(Continued)

(58) Field of Classification Search
CPC .. B62D 25/14; B62D 21/152; B62D 25/2045; B62D 25/081; B62D 25/088; B62D 25/084
(Continued)

(56) References Cited

U.S. PATENT DOCUMENTS

2011/0095568 A1    4/2011    Terada et al.
2014/0049072 A1    2/2014    Kim et al.
(Continued)

FOREIGN PATENT DOCUMENTS

CN    101992808    3/2011
CN    102632929    8/2012
(Continued)

OTHER PUBLICATIONS

International Search Report and Written Opinion for International Application Serial No. PCT/JP2018/017946 dated Aug. 7, 2018, 8 pages.

(Continued)

*Primary Examiner* — Joseph D. Pape
*Assistant Examiner* — Dana D Ivey
(74) *Attorney, Agent, or Firm* — Amin, Turocy & Watson, LLP

(57) ABSTRACT

This vehicle body front structure includes a front side frame (14) which extends in a forward and rearward direction of a vehicle body, and a side wall member (52) which is provided outside the front side frame (14) in a vehicle width direction and joined to the front side frame (14), wherein the front side frame (14) has at least three folding portions, which include a first folding portion (24), a second folding portion (25), and a third folding portion (26) capable of being bent by an impact load (F1, F3) input from in front of a vehicle, in this order at intervals from a front toward a rear of the vehicle body, and has a reinforcing panel (65) which is provided (Continued)

between the second folding portion (25) and the third folding portion (26) among the side wall members (52), is stacked on a compression portion (81) on which a compressive force (F2, F4) acts from the impact load (F1, F3), and has a vertical bead (87).

11 Claims, 16 Drawing Sheets

(51) Int. Cl.
*B62D 25/08* (2006.01)
*B62D 25/20* (2006.01)

(52) U.S. Cl.
CPC .......... *B62D 25/084* (2013.01); *B62D 25/088* (2013.01); *B62D 25/2045* (2013.01)

(58) Field of Classification Search
USPC ..................................................... 296/193.09
See application file for complete search history.

(56) References Cited

U.S. PATENT DOCUMENTS

| | | | | |
|---|---|---|---|---|
| 2016/0159399 | A1* | 6/2016 | Yasuhara | B62D 25/085 180/292 |
| 2016/0280272 | A1* | 9/2016 | Haga | B62D 21/152 |
| 2016/0347374 | A1 | 12/2016 | Miyamoto et al. | |

FOREIGN PATENT DOCUMENTS

| | | |
|---|---|---|
| CN | 105905169 | 8/2016 |
| JP | 59-190679 | 12/1984 |
| JP | 07-132856 | 5/1995 |
| JP | 2009-137381 | 6/2009 |
| JP | 2011-088597 | 5/2011 |
| WO | 2015-122276 | 8/2015 |

OTHER PUBLICATIONS

Chinese Office Action for Chinese Patent Application No. 201880034755.X dated Jul. 7, 2021.

\* cited by examiner

VEHICLE BODY FRONT STRUCTURE

TECHNICAL FIELD

The present invention relates to a vehicle body front structure.

The present application claims priority based on Japanese Patent Application No. 2017-109987 filed on Jun. 2, 2017, the contents of which are incorporated herein by reference.

BACKGROUND ART

As a vehicle body front structure, for example, a structure in which three folding portions including a front folding portion (a first folding part), an intermediate folding portion (a second folding portion), and a rear folding portion (a third folding portion) are provided in a front side frame is known. The second folding portion is located behind the vehicle body of the first folding portion, and the third folding portion is located behind the vehicle body of the second folding portion.

When a collision load is input from in front of a vehicle, the three folding portions of the front side frame including the first folding portion, the second folding portion, and the third folding portion are bent due to the input collision load. Thus, the collision load input from in front of the vehicle can be absorbed by the front side frame (for example, see Patent Document 1).

RELATED ART DOCUMENT

Patent Document

Patent Document 1: PCT International Publication No. WO 2015/122276

SUMMARY

Problems to be Solved by the Invention

However, a damper housing and a damper base are provided between the front side frame and an upper member. The damper base is connected to the front side frame via a damper housing.

Here, when an impact load is input from in front of the vehicle to a front end portion of the front side frame, a load which rotates the damper housing acts from the front side frame. Therefore, a portion of the damper housing between the intermediate folding portion and the rear folding portion is easily crushed by a compressive force. Accordingly, since the front side frame is stabilized by the three folding portions, it is difficult to bend the front side frame, and thus it is difficult to secure an amount of absorption of collision energy.

Therefore, an object of the present invention is to provide a vehicle body front structure which is able to secure an amount of absorption of impact energy by a front side frame when an impact load is input from in front of a vehicle.

Means for Solving the Problem

In order to solve the above-described problem, an aspect of the present invention has the following constitution.

(1) A vehicle body front structure according to the aspect of the present invention includes a front side frame which extends in a forward and rearward direction of a vehicle body, and a side wall member which is provided outside the front side frame in a vehicle width direction and joined to the front side frame, wherein the front side frame has at least three folding portions, which include a first folding portion, a second folding portion, and a third folding portion capable of being bent by an impact load input from in front of a vehicle, in this order at intervals from a front toward a rear of the vehicle body, and has a reinforcing panel which is provided between the second folding portion and the third folding portion among the side wall members, is stacked on a compression portion on which a compressive force acts from the impact load, and has a vertical bead.

As described above, a reinforcing panel is provided on a compression portion between the second folding portion and the third folding portion among the side wall members. That is, the compression portion can be reinforced with the reinforcing panel. Therefore, when a compressive force is applied to the compression portion by an impact load from in front of the vehicle, deformation of the compression portion can be curbed by the reinforcing panel. Thus, it is possible to make a sufficient load act on the first folding portion and to accelerate deformation of the first folding portion.

Further, the vertical bead is formed on the reinforcing panel. Therefore, a load which deforms the reinforcing panel can be adjusted by adjusting a shape of the vertical bead. Thus, the second folding portion and the third folding portion can be deformed in synchronization with the first folding portion by adjusting the shape of the vertical bead.

Therefore, when an impact load is input from in front of the vehicle, the front side frame can be stabilized in a three-folding mode using the first folding portion, the second folding portion, and the third folding portion. That is, the front side frame can be appropriately folded at the first folding portion, the second folding portion, and the third folding portion. Accordingly, a sufficient amount of absorption of impact energy by the front side frame can be secured.

Furthermore, the vertical bead is formed on the reinforcement panel. Therefore, a rigidity of the side wall member in the vertical direction of the vehicle body can be increased due to the vertical bead by stacking the reinforcing panel on the compression portion. Here, for example, when the side wall member is a damper housing, the rigidity of the damper housing in the vertical direction of the vehicle body can be increased by the vertical bead. Thus, the damper is appropriately held by the damper housing, and thus it is possible to contribute to a running stability of the vehicle.

(2) The vehicle body front structure described in (1) may further include a reinforcing member provided on the side wall member in a state in which it is continuous with the reinforcing panel, and the reinforcing member may be provided in the vicinity of the second folding portion to reinforce the second folding portion in a vertical direction of the vehicle body.

As described above, the second folding portion can be reinforced in the vertical direction of the vehicle body due to the reinforcing member by providing the reinforcing member in the vicinity of the second folding portion. Therefore, for example, when the side wall member is a damper housing, the rigidity of the front side frame in the vertical direction of the vehicle body can be further increased. Thus, the damper housing can be appropriately supported by the front side frame. Accordingly, the damper is appropriately held by the damper housing, and it is possible to contribute to the running stability of the vehicle.

(3) In the vehicle body front structure described in (2), the reinforcing member may have a joining flange which is joined to the side wall member, and the reinforcing panel may include a raised portion which is raised in a direction away from the side wall member with respect to the joining flange of the reinforcing member and has the vertical bead, and a joining recess portion which is formed in a concave shape from a peripheral edge portion of the raised portion to the side wall member and joined to the side wall member.

As described above, a reinforcing effect of the side wall member due to the reinforcing panel can be further enhanced by forming the raised portion on the reinforcing panel. Therefore, the compression portion of the side wall member can be made harder to deform. Thus, when an impact load is input from in front of the vehicle, the front side frame can be further stabilized in the three-folding mode using the first folding portion, the second folding portion, and the third folding portion.

Further, the rigidity of the side wall member can be further increased due to the raised portion by forming the raised portion on the reinforcing panel. Here, for example, when the side wall member is a damper housing, the rigidity of the damper housing can be further increased by the raised portion. Accordingly, a damper is appropriately held by the damper housing, and it is possible to contribute to the running stability of the vehicle.

(4) In the vehicle body front structure described in any one of (1) to (3), the side wall member may be a damper housing, and the damper housing may have a second vertical bead which is formed on the compression portion along the vertical bead of the reinforcing panel.

As described above, the second vertical bead is formed along the vertical bead at the compression portion of the damper housing. Therefore, the load which deforms the compression portion can be adjusted by adjusting a shape of the second vertical bead. Thus, the second folding portion and the third folding portion can be deformed in synchronization with the first folding portion by adjusting the shape of the second vertical bead.

Accordingly, when an impact load is input from in front of the vehicle, the front side frame can be stabilized in the three-folding mode using the first folding portion, the second folding portion, and the third folding portion.

Furthermore, the rigidity of the damper housing in the vertical direction of the vehicle body can be further enhanced due to the second vertical bead by forming the second vertical bead at the compression portion of the damper housing. Therefore, the damper is appropriately held by the damper housing, and thus it is possible to contribute to the running stability of the vehicle.

(5) The vehicle body front structure described in (4) may further include a dash lower which is coupled to the damper housing and the front side frame and partitions an engine compartment from a passenger compartment, a dash lower reinforcing panel which is joined to the dash lower from a passenger compartment side and reinforces the dash lower, an outrigger which is connected to the front side frame and extends to a side sill toward an outside in the vehicle width direction, a first joining portion in which three portions including the damper housing, the dash lower, and the dash lower reinforcing panel are joined while overlapping each other, a second joining portion in which three portions including the front side frame, the dash lower, and the dash lower reinforcing panel are joined while overlapping each other, and a third joining portion in which three portions including the outrigger, the dash lower, and the dash lower reinforcing panel are joined while overlapping each other, and a U-shaped joining portion which is open in a U-shape outward in the vehicle width direction may be formed by the first joining portion, the second joining portion, and the third joining portion.

As described above, the first joining portion is formed by the damper housing, the dash lower, and the dash lower reinforcing panel. Further, the third joining portion is formed by the outrigger, the dash lower, and the dash lower reinforcing panel.

Here, the damper housing is connected to the front pillar via the dash lower. The dash lower is connected to the front pillar via the side sill. Therefore, upper and lower end portions of the U-shaped joining portion are located in the vicinity of the front pillar. Thus, a load transmitted from the front side frame and the damper housing to the U-shaped joining portion can be efficiently transmitted to the front pillar. Accordingly, when an impact load is input from in front of the vehicle, the front side frame can be stabilized in the three-folding mode using the first folding portion, the second folding portion, and the third folding portion.

(6) The vehicle body front structure described in (5) may further include a dash upper which is provided on an upper portion of the dash lower and has a U-shaped cross section which is open upward from a front wall, a rear wall, and a bottom portion, and the damper housing may be joined to the front wall and the bottom portion of the dash upper over at least two or more corner portions.

Here, for example, when the damper housing is joined to the front wall and the bottom portion of the dash upper over one corner portion, it is conceivable that one corner have a right angle. However, when the joining portion of the damper housing is press-molded at a right angle, a crack or the like may occur. Therefore, it is necessary to form a notch in a portion to be press-molded at a right angle and to remove the portion to be press-molded at a right angle. Thus, an area of the joining portion of the damper housing is reduced, and it is difficult to firmly couple the damper housing to the dash upper.

Therefore, in (6), at least two or more corner portions are formed at the front wall and the bottom portion of the dash upper, and the damper housing is joined over the two or more corner portions. Therefore, the two or more corner portions can be formed to have obtuse angles. Thus, the joining portion of the damper housing can be press-molded at an obtuse angle, and it is possible to curb generation of cracks or the like in the joining portion. Therefore, it is not necessary to form a notch in the joining portion. Accordingly, the area of the joining portion of the damper housing can be ensured, and the damper housing and the dash upper can be coupled firmly.

That is, the damper housing can be appropriately supported by the dash upper. Therefore, a load which deforms the compression portion can be adjusted by adjusting the shape of the vertical bead of the reinforcement panel. Thus, it is possible to deform the second folding portion and the third folding portion in synchronization with the first folding portion by adjusting the shape of the vertical bead, and the three-point folding mode can be stabilized.

Advantage of the Invention

According to the aspect of the present invention, the reinforcing panel is provided at the compression portion of the side wall member. Therefore, when a compressive force is applied to the compression portion by an impact load from in front of the vehicle, the deformation of the compression portion can be curbed by the reinforcing panel. Thus, a sufficient load can be applied to the folding portion of the front side frame. As a result, the deformation of the folding portion is promoted, and an amount of absorption of impact energy by the front side frame can be ensured.

DESCRIPTION OF THE EMBODIMENTS

Figure 1:
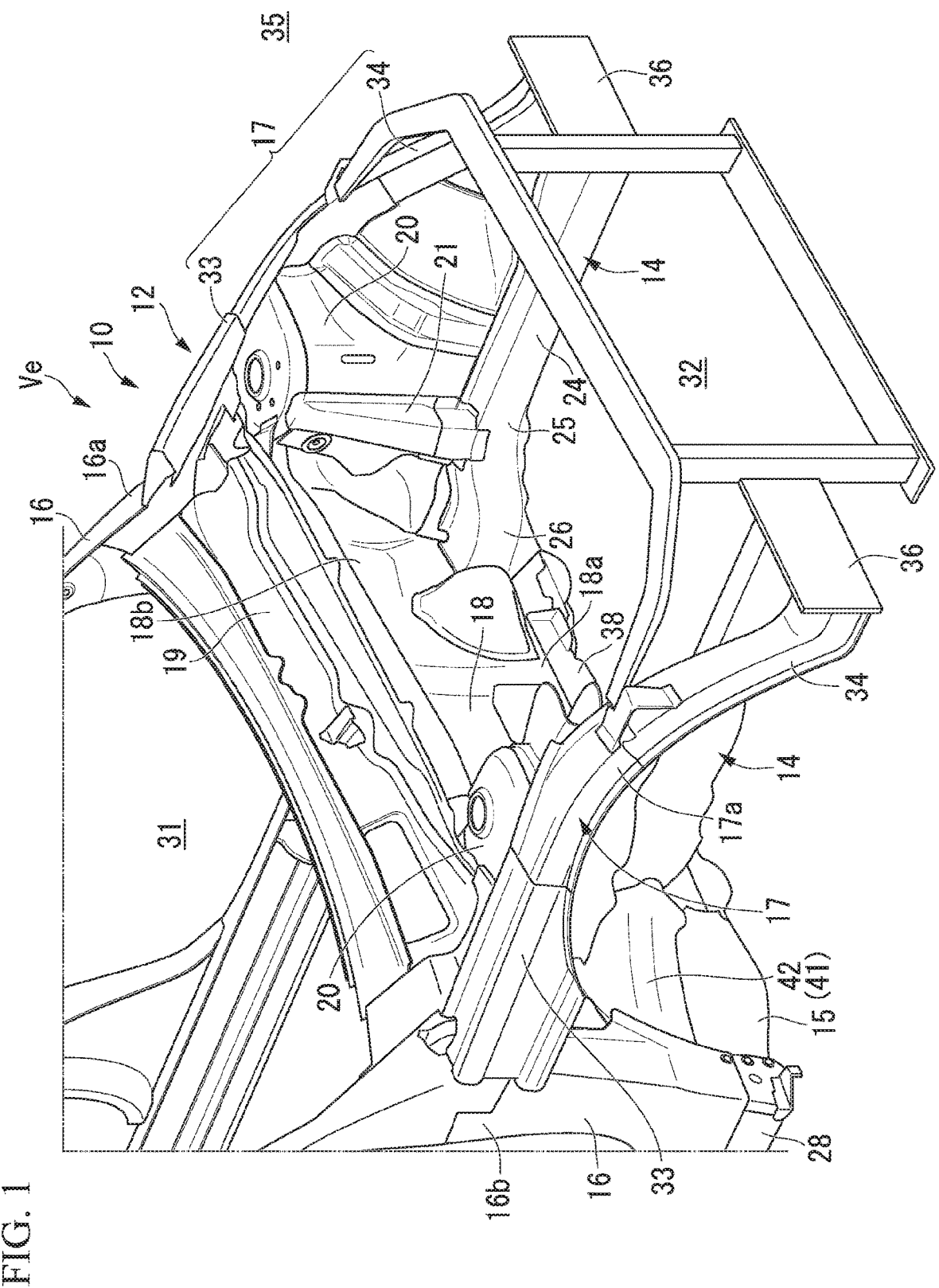
FIG. 1 is a perspective view showing a vehicle body front structure according to an embodiment of the present invention.

An embodiment of the present invention will be described with reference to the drawings. In the drawing, an arrow FR indicates the front side of the vehicle, an arrow UP indicates the upper side of the vehicle, and an arrow LH indicates the left side of the vehicle.

A vehicle body front structure 12 has a substantially bilaterally symmetrical constitution. Therefore, the same reference numerals are given to a left component and a right component, a left constitution will be described, and the description of a right constitution will be omitted.

Figure 2:
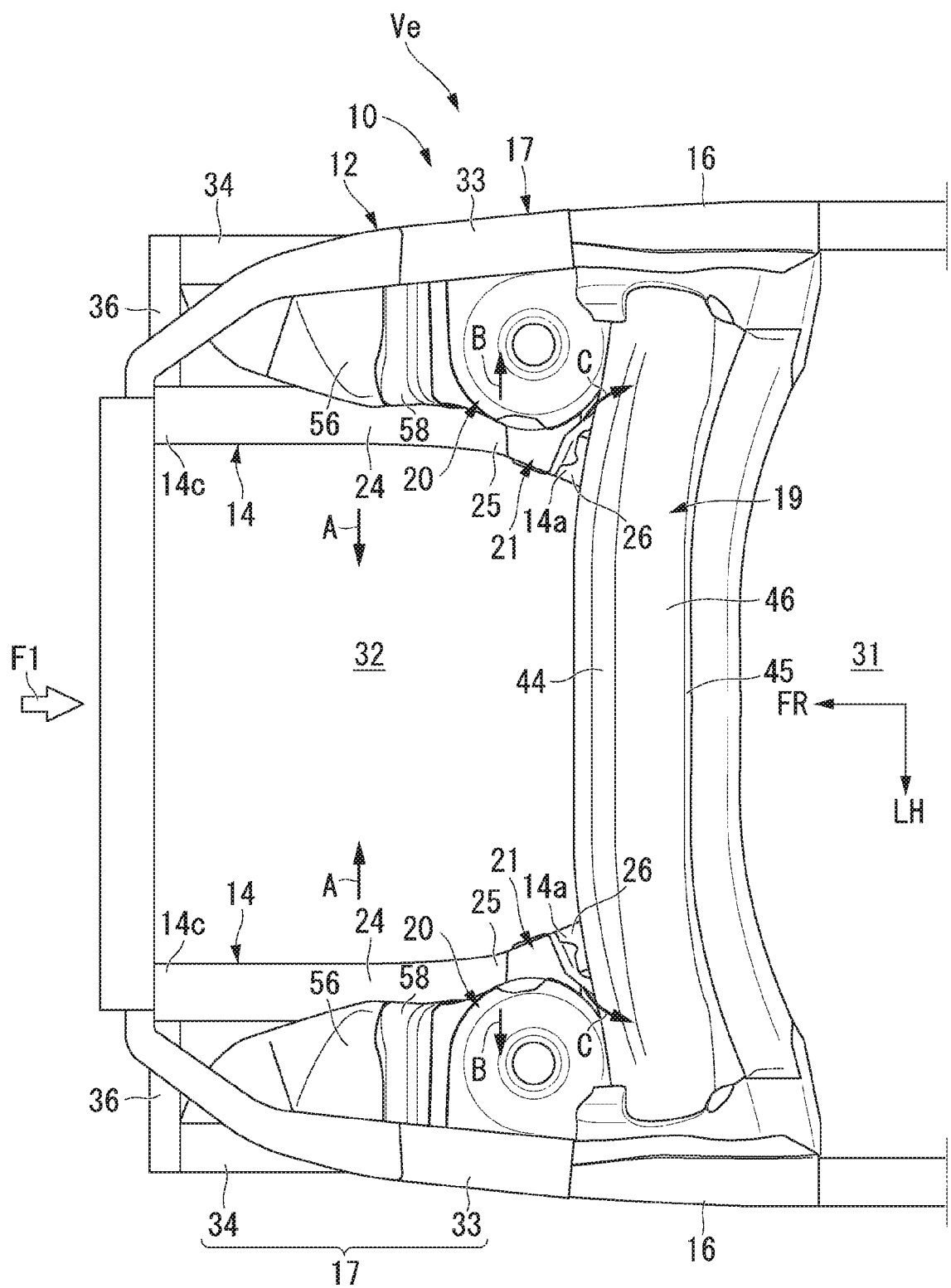
FIG. 2 is a plan view showing the vehicle body front structure according to the embodiment of the present invention.

As shown in FIGS. 1 and 2, a vehicle body 10 includes the vehicle body front structure 12 which constitutes a lower portion of the vehicle body 10. The vehicle body front structure 12 includes a front side frame 14, an outrigger 15 (refer to also FIG. 3), a front pillar 16, an upper member 17, a dash lower 18, a dash upper 19, a damper housing unit 20, a reinforcing unit 21, and a dash lower reinforcing panel 92 (refer to FIG. 9).

The front side frame 14 is disposed on the left side in a vehicle width direction and extends in a forward and rearward direction of the vehicle body. The front side frame 14 is formed in a closed cross section having a rectangular cross section.

The front side frame 14 includes a first folding portion 24, a second folding portion 25, and a third folding portion 26 which are sequentially provided at intervals from the front toward the rear of the vehicle body.

That is, the first folding portion 24 is a front folding portion. The second folding portion 25 is an intermediate folding portion.

The third folding portion 26 is a rear folding portion.

The first folding portion 24, the second folding portion 25, and the third folding portion 26 are formed to be weaker since their rigidity is reduced such that it is lower than a rigidity of the other portions of the front side frame 14.

In order to reduce the rigidity of the first folding portion 24, the second folding portion 25, and the third folding portion 26, for example, it is conceivable that a vertical bead, an opening portion, a slit, or the like be formed in each of the folding portions, or the material of each of the folding portions 24, 25, and 26 be changed.

Thus, the front side frame 14 is formed to be bent at the first folding portion 24, the second folding portion 25, and the third folding portion 26 by an impact load F1 input from in front of the vehicle Ve.

Specifically, the first folding portion 24 is formed to be bent inward in the vehicle width direction, as indicated by an arrow A, by the impact load F1 input from in front of the vehicle Ve. Further, the second folding portion 25 is formed to be bent outward in the vehicle width direction, as indicated by an arrow B, by the impact load F1.

The third folding portion 26 is formed so that the rear frame portion 14a is bent outward in the vehicle width direction, as indicated by an arrow C, by the impact load F1. That is, the rear frame portion 14a is bent outward in the vehicle width direction by the impact load F1 with the third folding portion 26 as a fulcrum. The rear frame portion 14a is a portion of the front side frame 14 between the second folding portion 25 and the third folding portion 26.

Figure 3:
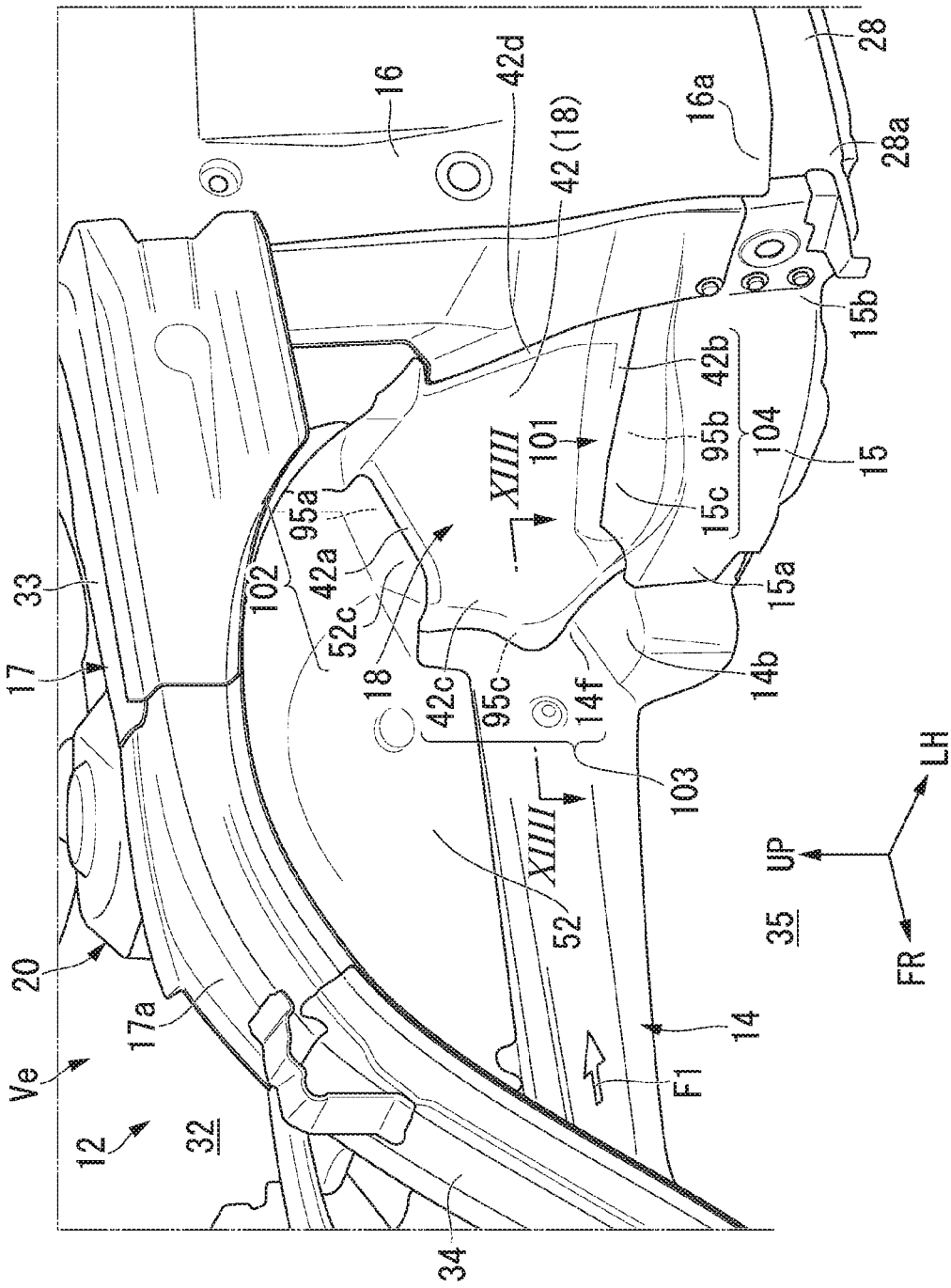
FIG. 3 is a perspective view showing a state in which the vehicle body front structure according to the embodiment of the present invention is seen from the left rear side.

As shown in FIG. 3, an inner end portion 15a of the outrigger 15 is connected to a rear end portion 14b of the front side frame 14. The outrigger 15 extends to a front end portion 28a of a side sill 28 toward the outside in the vehicle width direction. An outer end portion 15b of the outrigger 15 is connected to the front end portion 28a of the side sill 28.

The side sill 28 is provided in a left outer side portion in the vehicle width direction and extends in the forward and rearward direction of the vehicle body. The side sill 28 is provided on the left outer side of a passenger compartment 31 (refer to FIG. 2) in the vehicle width direction and at a lower portion of the passenger compartment 31.

A lower end portion 16a of the front pillar 16 is connected to the front end portion 28a of the side sill 28 and the outer end portion 15b of the outrigger 15. The front pillar 16 stands upward from the front end portion 28a of the side sill 28 and the outer end portion 15b of the outrigger 15.

Returning to FIG. 1, the upper member 17 extends from an upper front portion 16b of the front pillar 16 toward the front of the vehicle body. The upper member 17 includes a horizontal member 33 and a curved member 34. The horizontal member 33 extends substantially horizontally from the upper front portion 16b of the front pillar 16 to a central portion 17a toward the front of the vehicle body. The curved member 34 extends downward in a curved shape from the central portion 17a to a connecting member 36.

The connecting member 36 is installed at a front end portion 14c of the front side frame 14. Therefore, the curved member 34 of the upper member 17 is connected to the front end portion 14c of the front side frame 14 via the connecting member 36.

As shown in FIGS. 1 and 3, a cross member 38 bridges between the left front side frame 14 and the right front side frame 14.

The dash lower 18 and the dash upper 19 bridge between the left front pillar 16 and the right front pillar 16.

A lower end portion 18a of the dash lower 18 is joined to the cross member 38. The dash lower 18 has a wheel house rear portion 42 at a left end portion thereof.

The wheel house rear portion 42 is a portion which forms a rear portion of a wheel house 41 and is formed to be recessed in a curved shape toward the passenger compartment 31 side. The wheel house 41 is a side wall which partitions an engine compartment 32 from an outside 35. Therefore, a front wheel is partitioned from the engine compartment 32 by the wheel house 41.

The wheel house rear portion 42 includes an upper edge portion 42a, a lower edge portion 42b, an inner edge portion 42c, and an outer edge portion 42d.

The wheel house rear portion 42 is formed in a U shape to be open toward the outside in the vehicle width direction by the upper edge portion 42a, the lower edge portion 42b, and the inner edge portion 42c.

A rear edge portion 52c (described later) of a damper housing 52 is coupled to the upper edge portion 42a.

An outrigger upper edge portion 15c of the outrigger 15 is coupled to the lower edge portion 42b.

The rear end portion 14b of the front side frame 14 is coupled to the inner edge portion 42c.

The engine compartment 32 and the passenger compartment 31 are partitioned by the dash lower 18.

A lower portion 19a (refer to FIG. 5) of the dash upper 19 is joined to an upper portion 18b of the dash lower 18.

Figure 4:
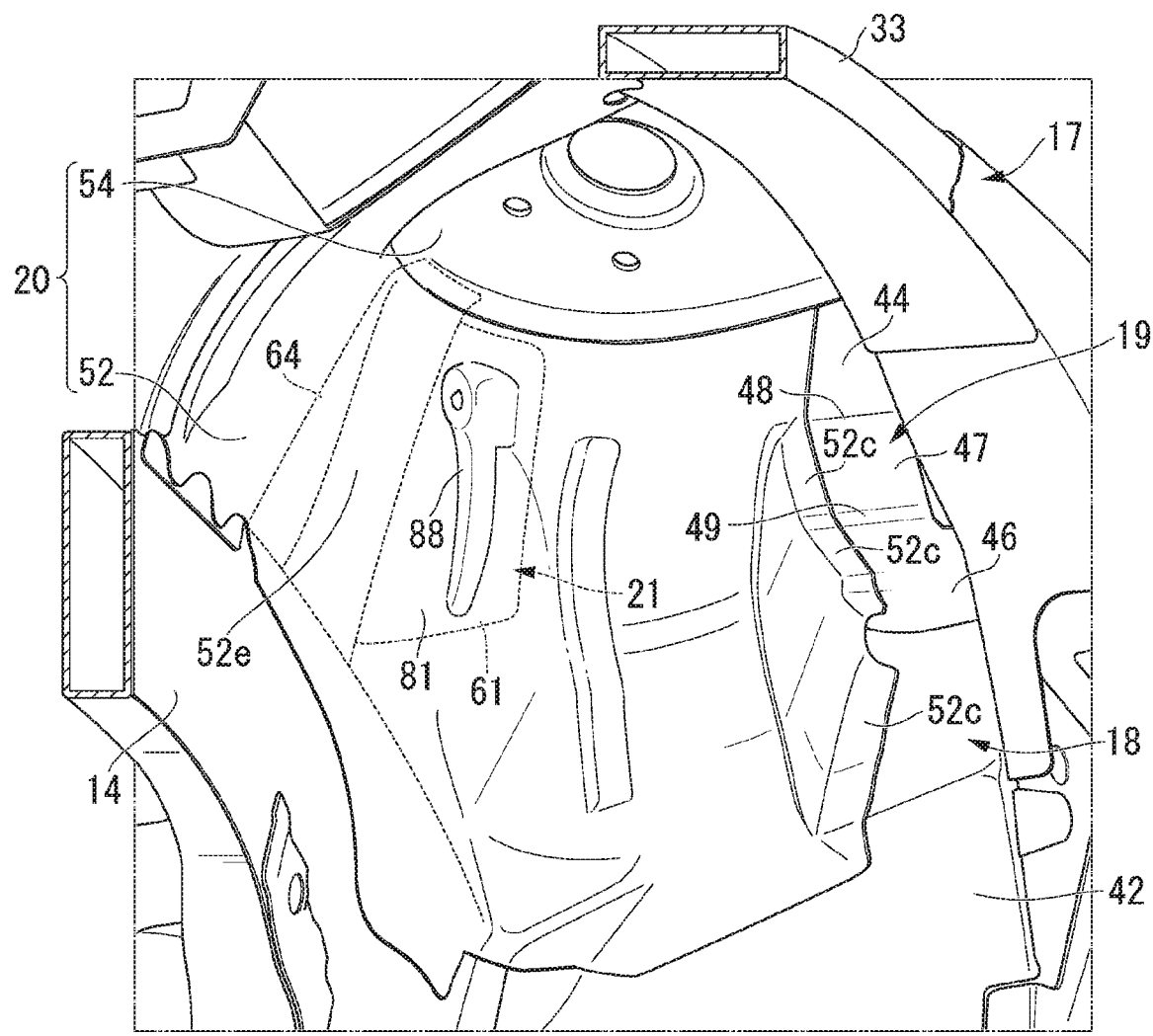
FIG. 4 is a perspective view showing a state in which a damper housing unit of the vehicle body front structure according to the embodiment of the present invention is seen from the left front side.
Figure 4:
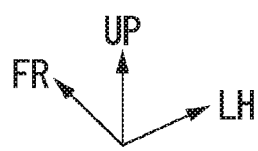
Figure 5:
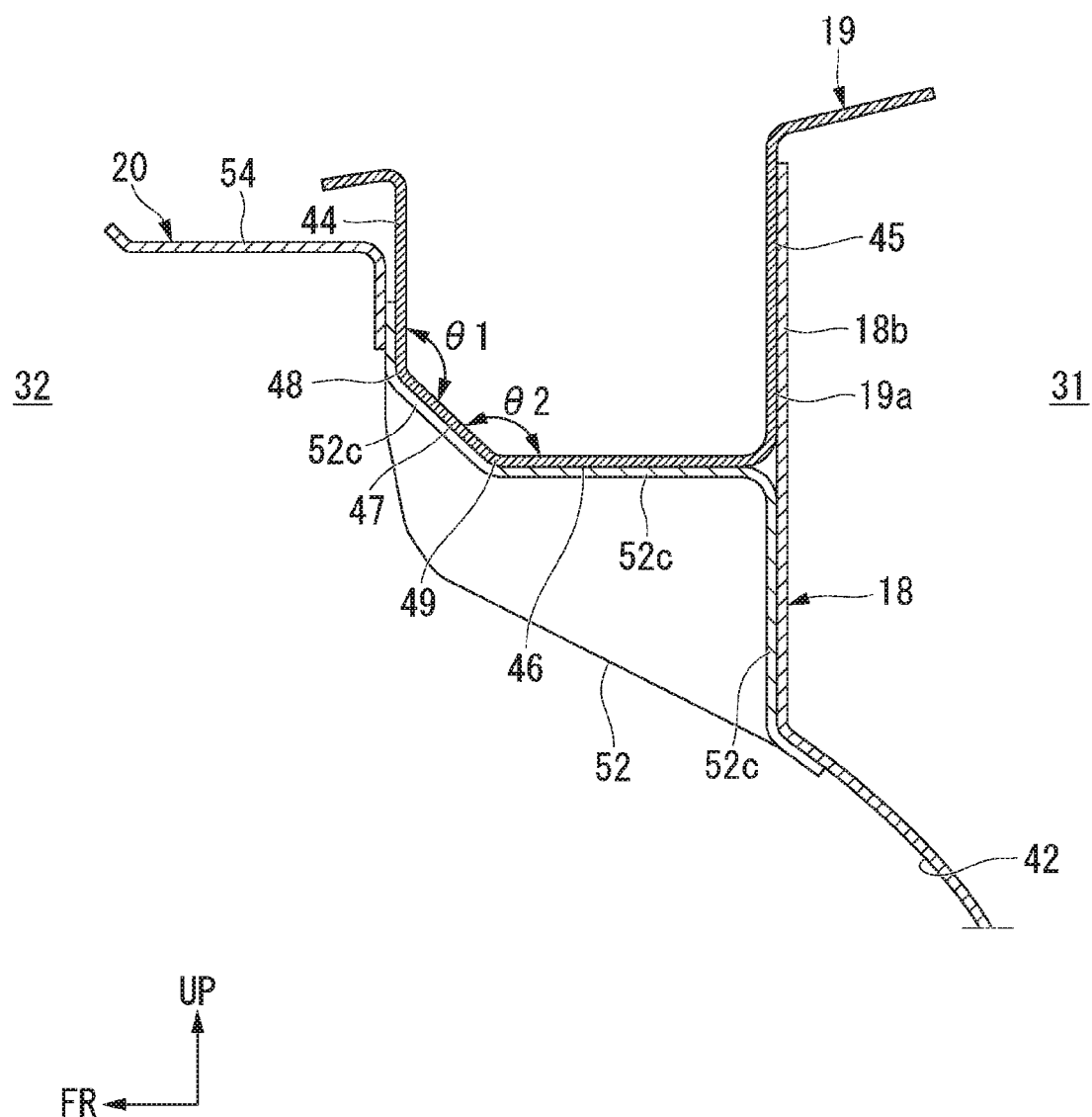
FIG. 5 is a cross-sectional view showing a dash lower and a dash upper of the vehicle body front structure according to the embodiment of the present invention.

As shown in FIGS. 4 and 5, the dash upper 19 is provided on the upper portion 18b of the dash lower 18. The dash upper 19 includes an upper front wall (a front wall) 44, an upper rear wall (a rear wall) 45, an upper bottom portion (a bottom portion) 46, and an upper inclined portion 47.

The upper front wall 44 is provided on the engine compartment 32 side and is disposed in a state in which it stands substantially vertically. The upper rear wall 45 is disposed behind the vehicle body with respect to the upper front wall 44 and is provided on the passenger compartment 31 side.

Like the upper front wall 44, the upper rear wall 45 is disposed in a state in which it stands substantially vertically.

The upper bottom portion 46 protrudes horizontally from a lower end of the upper rear wall 45 toward the front of the vehicle body. The upper inclined portion 47 protrudes from a front end of the upper bottom portion 46 to a lower end of the upper front wall 44 toward the front of the vehicle body with an upward gradient.

A first corner portion (a corner portion) 48 is formed at an intersection of the upper front wall 44 and the upper inclined portion 47. A second corner portion (a corner portion) 49 is formed at an intersection of the upper inclined portion 47 and the upper bottom portion 46.

Here, an angle $\theta 1$ of the first corner portion 48 and an angle $\theta 2$ of the second corner portion 49 are formed as obtuse angles by interposing the upper inclined portion 47 between the upper front wall 44 and the upper bottom portion 46.

The dash upper 19 is formed by the upper front wall 44, the upper rear wall 45, the upper bottom portion 46, and the upper inclined portion 47 to have a U-shaped cross section of which an upper portion is open.

Figure 6:
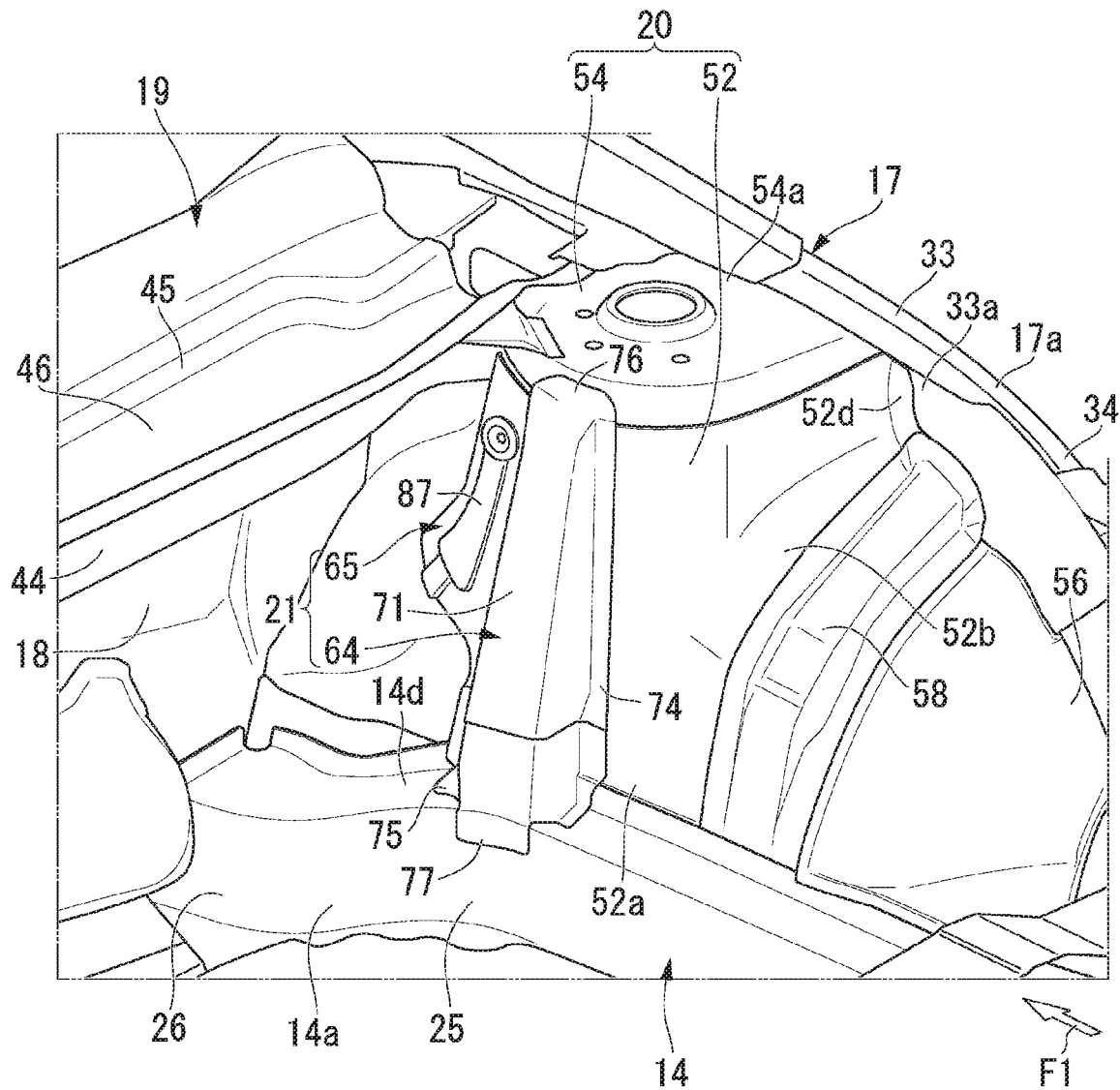
FIG. 6 is a perspective view showing a damper housing unit and a reinforcing unit of the vehicle body front structure according to the embodiment of the present invention.
Figure 6:
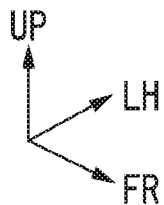
Figure 7:
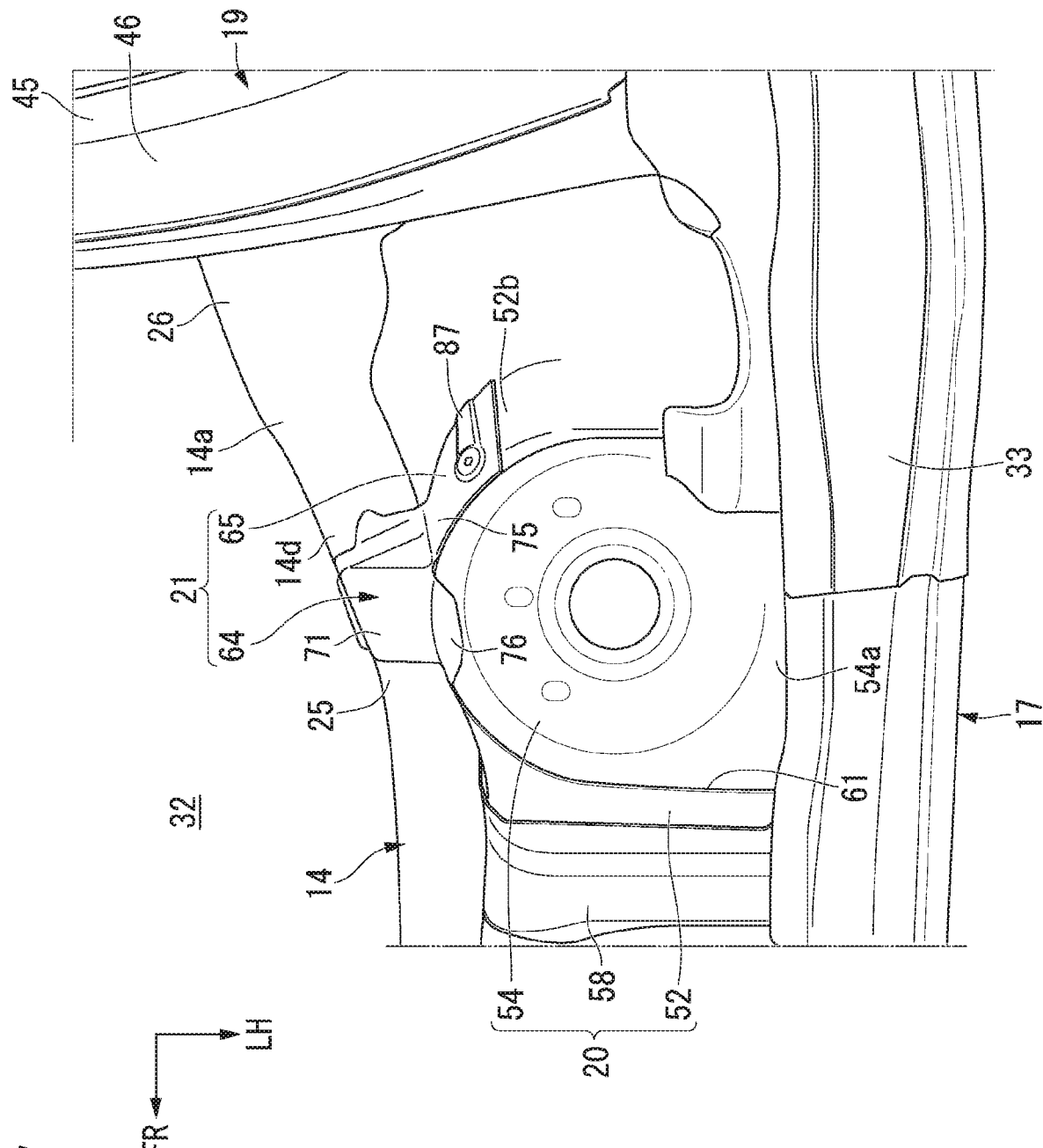
FIG. 7 is a plan view showing the damper housing unit and the reinforcing unit of the vehicle body front structure according to the embodiment of the present invention.

As shown in FIGS. 6 and 7, the damper housing unit 20 is installed between the rear frame portion 14a of the front side frame 14 and the horizontal member 33 of the upper member 17. The damper housing unit 20 includes a damper housing (a side wall member) 52 and a damper base 54. The damper housing 52 is formed in a substantially U shape in a plan view to be open outward in the vehicle width direction.

That is, the damper housing 52 is provided outside the front side frame 14 in the vehicle width direction. An inner lower edge portion 52a of the damper housing 52 is joined to an upper portion 14d of the rear frame portion 14a.

Further, a front edge portion 52b of the damper housing 52 is joined to a wheel house front portion 56. A wheel house reinforcing member 58 is joined to the front edge portion 52b of the damper housing 52 and the wheel house front portion 56.

The rear edge portion 52c (refer to FIG. 4) of the damper housing 52 is joined to the dash upper 19 and the wheel house rear portion 42 (refer to FIG. 4) of the dash lower 18. A front outer edge portion 52d of the damper housing 52 is joined to an inner wall portion 33a of the horizontal member 33.

As shown in FIGS. 4 and 5, the rear edge portion 52c of the damper housing 52 is joined to the upper front wall 44, the upper bottom portion 46, and the upper inclined portion 47 of the dash upper 19. That is, the rear edge portion 52c of the damper housing 52 is joined to the dash upper 19 over the first corner portion 48 and the second corner portion 49.

Here, the angle $\theta 1$ of the first corner portion 48 and the angle $\theta 2$ of the second corner portion 49 are formed as obtuse angles. Therefore, it is possible to press-mold the rear edge portion 52c of the damper housing 52 to have an obtuse angle. That is, when the rear edge portion 52c of the damper housing 52 is press-molded, it is possible to curb cracking or the like of the rear edge portion 52c. Therefore, it is not necessary to form a notch in the rear edge portion 52c of the damper housing 52. Thus, an area of the rear edge portion 52c of the damper housing 52 can be secured, and the damper housing 52 and the dash upper 19 can be firmly coupled.

That is, the damper housing 52 can be suitably supported by the dash upper 19.

On the other hand, for example, when the rear outer edge portion of the damper housing 52 is joined to the upper front wall 44 and the upper bottom portion 46 of the dash upper 19 over one corner portion, it is conceivable that the one corner portion have a right angle. However, when the rear outer edge portion of the damper housing is press-molded at a right angle, a crack or the like may occur in the rear outer edge portion. Therefore, it is necessary to form a notch in a portion to be press-molded at a right angle and to remove the portion to be press-molded at a right angle. Thus, the area of the rear outer edge portion of the damper housing is reduced, and it is difficult to firmly couple the damper housing to the dash upper.

Returning to FIGS. 7 and 8, a substantially U-shaped opening portion 61 which is open outward in the vehicle width direction is formed at an upper end portion of the damper housing 52. The damper base 54 is joined to the opening portion 61. An outer edge portion 54a of the damper base 54 is joined to the inner wall portion 33a of the horizontal member 33.

An upper end of the damper is installed on the damper base 54, and a wheel is connected to the damper.

The reinforcing unit 21 is joined to a housing portion 52e inside the damper housing 52 in the vehicle width direction. The reinforcing unit 21 includes a reinforcing member 64 and a reinforcing panel 65.

The reinforcing member 64 includes a reinforcing side wall 71, a reinforcing front wall 72, a reinforcing rear wall 73, a front joining flange (a joining flange) 74, a rear joining flange (a joining flange) 75, an upper joining flange 76, and a lower joining flange 77.

The reinforcing side wall 71 is disposed at a distance from the housing portion 52e inward in the vehicle width direction. The reinforcing side wall 71 is formed in an inclined shape to gradually approach the housing portion 52e from a lower end portion 71a toward an upper end portion 71b.

The reinforcing front wall 72 protrudes from a front side of the reinforcing side wall 71 toward the housing portion 52e. Further, the reinforcing rear wall 73 protrudes from a rear side of the reinforcing side wall 71 toward the housing portion 52e. Therefore, the reinforcing member 64 is formed in a U-shaped cross section by the reinforcing side wall 71, the reinforcing front wall 72, and the reinforcing rear wall 73.

The front joining flange 74 protrudes from an inner end of the reinforcing front wall 72 toward the front of the vehicle body along the housing portion 52e and the upper portion 14d of the rear frame portion 14a. The front joining flange 74 is joined to the housing portion 52e and the upper portion 14d of the rear frame portion 14a.

The rear joining flange 75 (also refer to FIG. 10) protrudes from an inner end of the reinforcing rear wall 73 toward the rear of the vehicle body along the housing portion 52e and the upper portion 14d of the rear frame portion 14a. The rear joining flange 75 is joined to the housing portion 52e and the upper portion 14d of the rear frame portion 14a.

The upper joining flange 76 protrudes from an upper end of the reinforcing side wall 71 along the damper base 54. The upper joining flange 76 is joined to the damper base 54.

The lower joining flange 77 protrudes from a lower end of the reinforcing side wall 71 along an inner wall portion 14e of the rear frame portion 14a. The lower joining flange 77 is joined to the inner wall portion 14e of the rear frame portion 14a.

Therefore, the reinforcing member 64 is joined to the housing portion 52e, the damper base 54, and the rear frame portion 14a. Thus, the housing portion 52e or the rear frame portion 14a is reinforced by the reinforcing member 64.

Here, the reinforcing member 64 is provided in the vicinity of the second folding portion 25. That is, the second folding portion 25 is reinforced by the reinforcing member 64 in the vertical direction of the vehicle body 10. Therefore, for example, the rigidity of the front side frame 14 in the vertical direction of the vehicle body can be further increased. Thus, the damper housing 52 is appropriately held by the front side frame 14. Accordingly, the damper is appropriately held by the damper housing 52, and thus it is possible to contribute to running stability of the vehicle.

Figure 8:
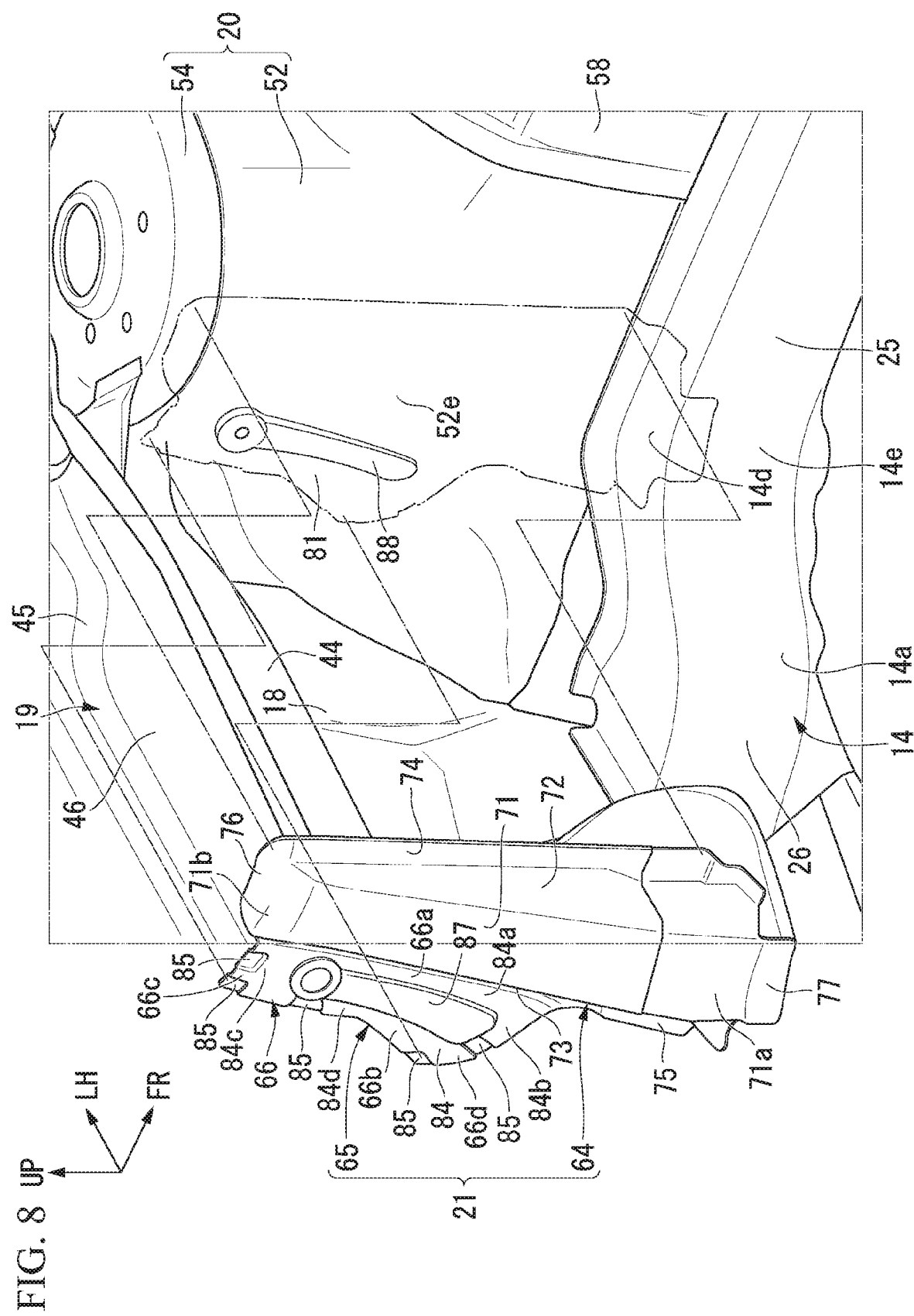
FIG. 8 is an exploded perspective view showing a state in which the reinforcing unit is disassembled from the damper housing unit of the vehicle body front structure according to the embodiment of the present invention.
Figure 9:
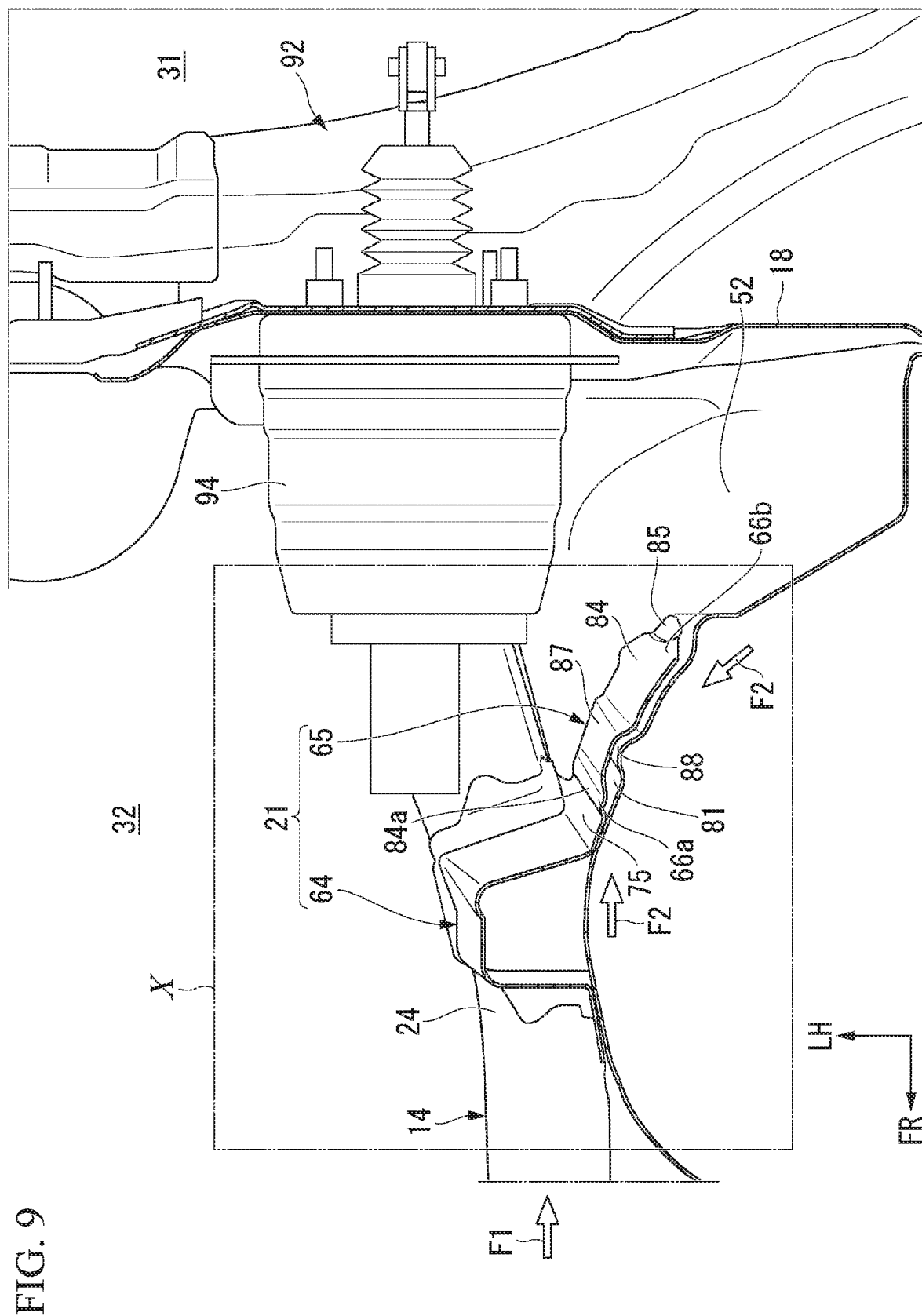
FIG. 9 is a plan view showing a state in which the damper housing unit and the reinforcement unit of the vehicle body front structure according to the embodiment of the present invention are horizontally cut away.

As shown in FIGS. 8 and 9, the reinforcing panel 65 is provided on a rear side of the rear joining flange 75 in a continuous state.

The reinforcing panel 65 is stacked on a compression portion 81 of the damper housing 52.

The compression portion 81 is a portion of the damper housing 52 which is provided between the second folding portion 25 and the third folding portion 26 and to which a compressive force acts due to the impact load F1.

A peripheral edge portion 66 of the reinforcing panel 65 is formed in a quadrangular shape by a panel front side 66a, a panel rear side 66b, a panel upper side 66c, and a panel lower side 66d.

The reinforcing panel 65 includes a raised portion 84 and a plurality of joining recess portions 85.

The raised portion 84 is formed to be slightly smaller than the peripheral edge portion 66. The raised portion 84 is raised in a direction away from the damper housing 52 with respect to the rear joining flange 75 of the reinforcing member 64. Further, the raised portion 84 has a first vertical bead (a vertical bead) 87.

The first vertical bead 87 protrudes in a direction away from the damper housing 52 at a portion 84a of the raised portion 84 in the vicinity of the rear joining flange 75 of the reinforcing member 64. The first vertical bead 87 is formed to extend in the vertical direction along the rear joining flange 75 from a lower end portion 84b of the raised portion 84 to a portion 84d in the vicinity of an upper end portion 84c.

The plurality of joining recess portions 85 are provided in the peripheral edge portion 66 of the raised portion 84. Each of the joining recess portion 85 is formed in a concave shape from the peripheral edge portion 66 of the damper housing 52 to the damper housing 52 and is joined to the damper housing 52. Therefore, the reinforcing panel 65 is stacked on the compression portion 81 of the damper housing 52. Since the reinforcing panel 65 is stacked on the compression portion 81, the compression portion 81 is reinforced by the reinforcing panel 65. Thus, when a compressive force F2 acts on the compression portion 81 from in front of the vehicle Ve due to the impact load F1, deformation of the compression portion 81 can be curbed by the reinforcing panel 65. Accordingly, the impact load F1 can be sufficiently applied to the first folding portion 24 (refer to FIG. 2) of the front side frame 14, and deformation of the first folding portion 24 can be promoted.

Figure 10:
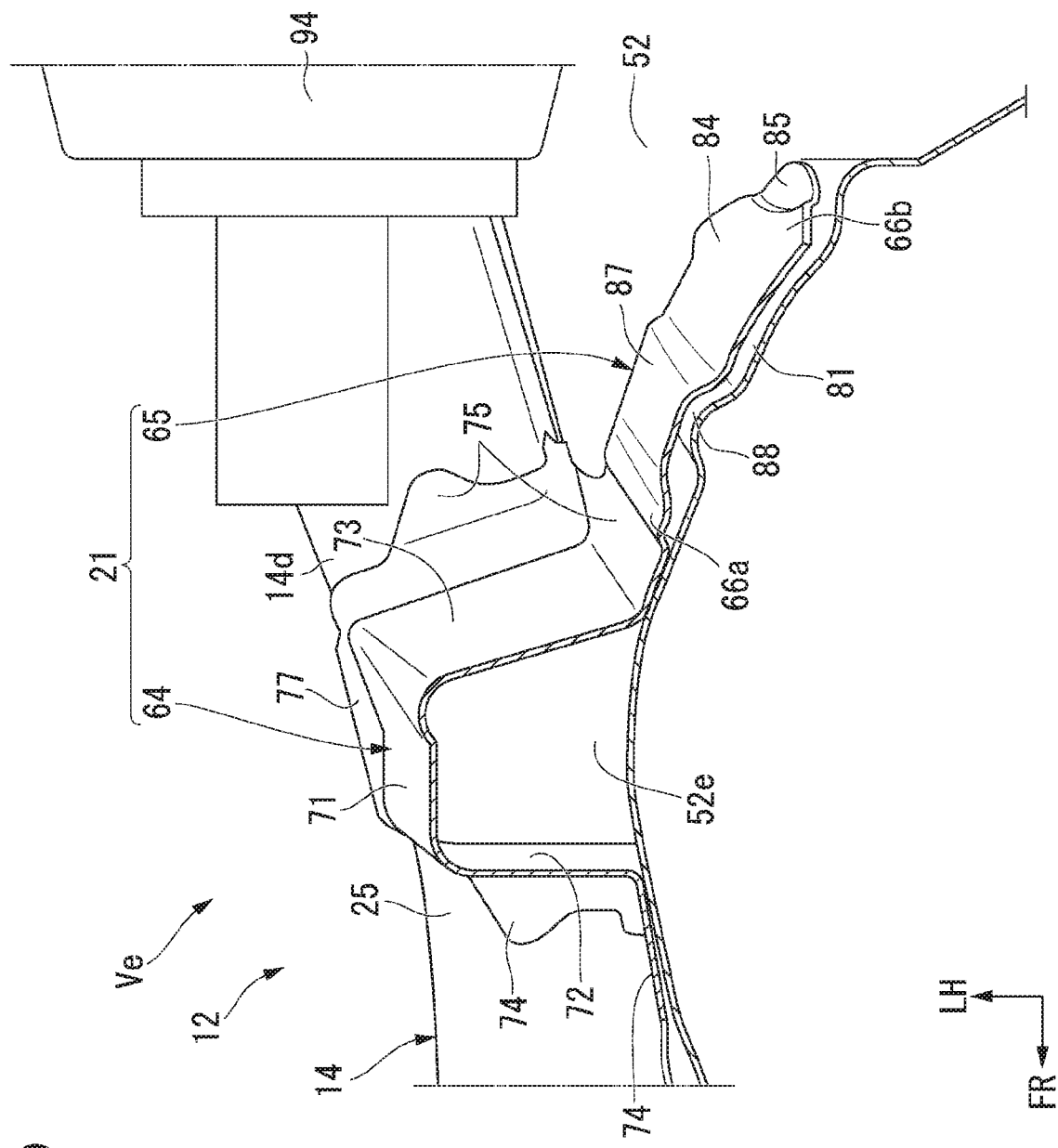
FIG. 10 is an enlarged plan view showing a portion X in FIG. 9 according to the embodiment of the present invention.

As shown in FIGS. 8 and 10, the damper housing 52 has a second vertical bead 88 at the compression portion 81. The second vertical bead 88 is formed to extend in the vertical direction along the first vertical bead 87 of the reinforcing panel 65. As described above, the second vertical bead 88 is formed in addition to the first vertical bead 87. Therefore, a load which deforms the compression portion 81 can be favorably adjusted by adjusting a shape of the first vertical bead 87 and a shape of the second vertical bead 88. Thus, the second folding portion 25 and the third folding portion 26 can be favorably deformed in synchronization with the first folding portion 24 by adjusting the shape of the first vertical bead 87 and the shape of the second vertical bead 88.

Therefore, as shown in FIG. 2, when the impact load F1 is input from in front of the vehicle Ve, the front side frame 14 can be stabilized in a three-point folding mode of the first folding portion 24, the second folding portion 25, and the third folding portion 26. That is, the front side frame 14 can be appropriately folded at the first folding portion 24, the second folding portion 25, and the third folding portion 26. Accordingly, an amount of absorption of impact energy by the front side frame 14 can be sufficiently secured.

Furthermore, as shown in FIG. 10, the first vertical bead 87 is formed at the reinforcing panel 65. In addition, the second vertical bead 88 is formed at the compression portion 81. Therefore, the rigidity of the damper housing 52 in the vertical direction of the vehicle body can be increased due to the first vertical bead 87 and the second vertical bead 88 by stacking the reinforcing panel 65 on the compression portion 81.

That is, the rigidity of the damper housing 52 in the vertical direction of the vehicle body is enhanced by the first vertical bead 87 and the second vertical bead 88. Accordingly, the damper is appropriately held by the damper housing 52, and it is possible to contribute to the running stability of the vehicle Ve.

Further, as shown in FIGS. 2 and 10, the raised portion 84 is formed on the reinforcing panel 65. Therefore, a reinforcing effect of the compression portion 81 due to the reinforcing panel 65 can be further enhanced. That is, the compression portion 81 can be made more difficult to deform. Thus, when the impact load F1 is input from in front of the vehicle Ve, the front side frame 14 can be further stabilized in the three-point folding mode of the first folding portion 24, the second folding portion 25, and the third folding portion 26.

Furthermore, since the raised portion 84 is formed on the reinforcing panel 65, the rigidity of the damper housing 52 can be further increased by the raised portion 84. Thus, the damper is held more appropriately by the damper housing 52, and it is possible to contribute to the running stability of the vehicle Ve.

Here, as shown in FIGS. 4 and 5, the rear edge portion 52c of the damper housing 52 is joined to the dash upper 19 over the first corner portion 48 and the second corner portion 49. The first corner portion 48 and the second corner portion 49 are formed to have obtuse angles. Therefore, it is possible to press-mold the rear edge portion 52c of the damper housing 52 at an obtuse angle, and it is not necessary to form a notch in the rear edge portion 52c.

Thus, the area of the rear edge portion 52c of the damper housing 52 can be secured, and the damper housing 52 and the dash upper 19 can be firmly coupled. That is, the damper housing 52 can be appropriately supported by the dash upper 19.

Accordingly, as shown in FIG. 2, the second folding portion 25 and the third folding portion 26 can be deformed in synchronization with the first folding portion 24, and the three-point folding mode can be stabilized. Therefore, the front side frame 14 can be appropriately folded at the first folding portion 24, the second folding portioning 25, and the third folding portion 26.

Figure 11:
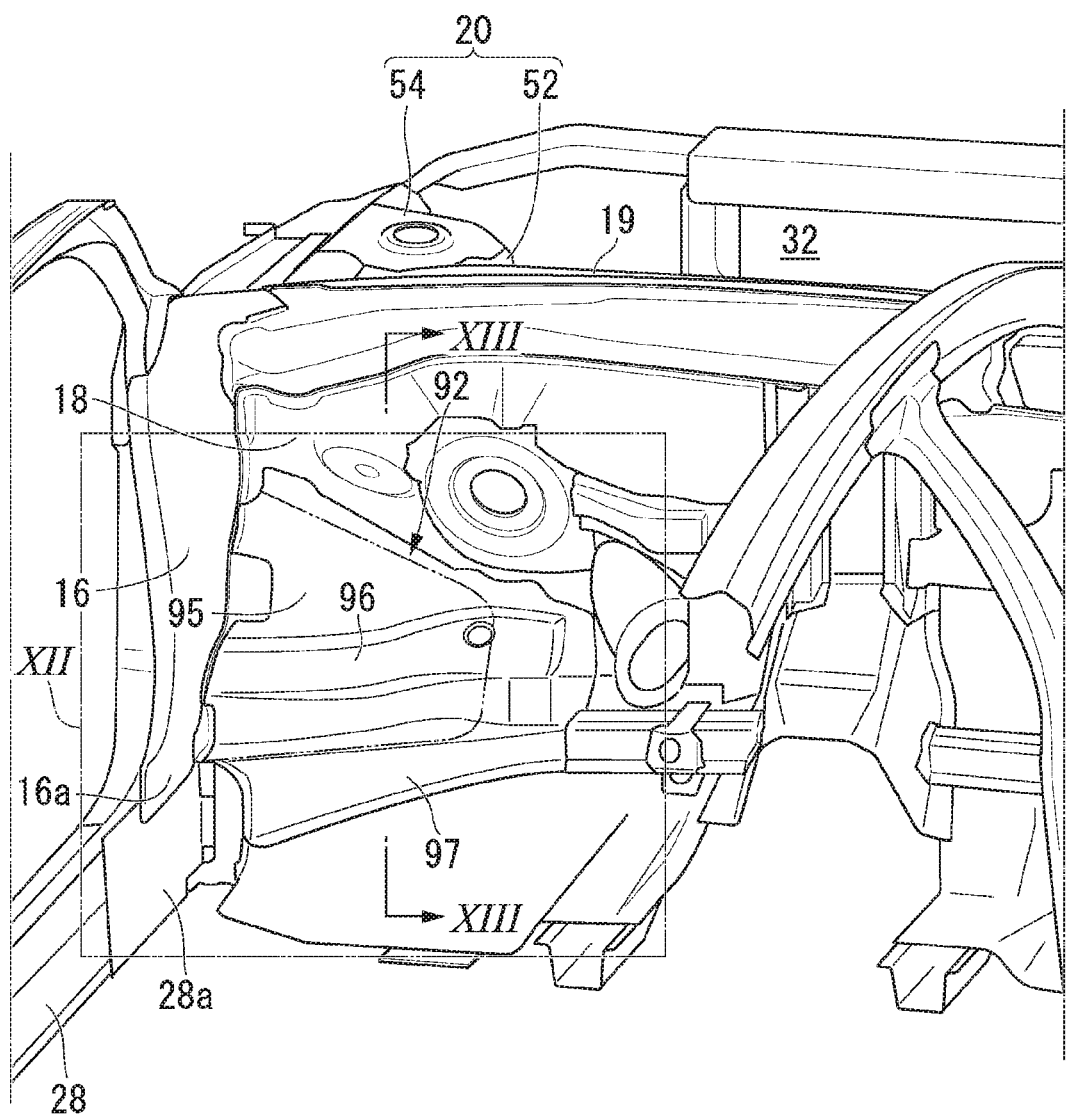
FIG. 11 is a perspective view showing a state in which the vehicle body front structure according to the embodiment of the present invention is seen from a rear of the vehicle.

As shown in FIGS. 9 and 11, the dash lower reinforcing panel 92 is joined to the dash lower 18 from the passenger compartment 31 side. A brake master cylinder 94 is installed at the dash lower 18. The brake master cylinder 94 is a device which converts a pedal depression force acting on a brake pedal into a hydraulic pressure and pumps a brake fluid to a wheel cylinder or the like.

The brake master cylinder 94 is disposed on the engine compartment 32 side and is located in the vicinity of the damper housing 52.

Figure 12:
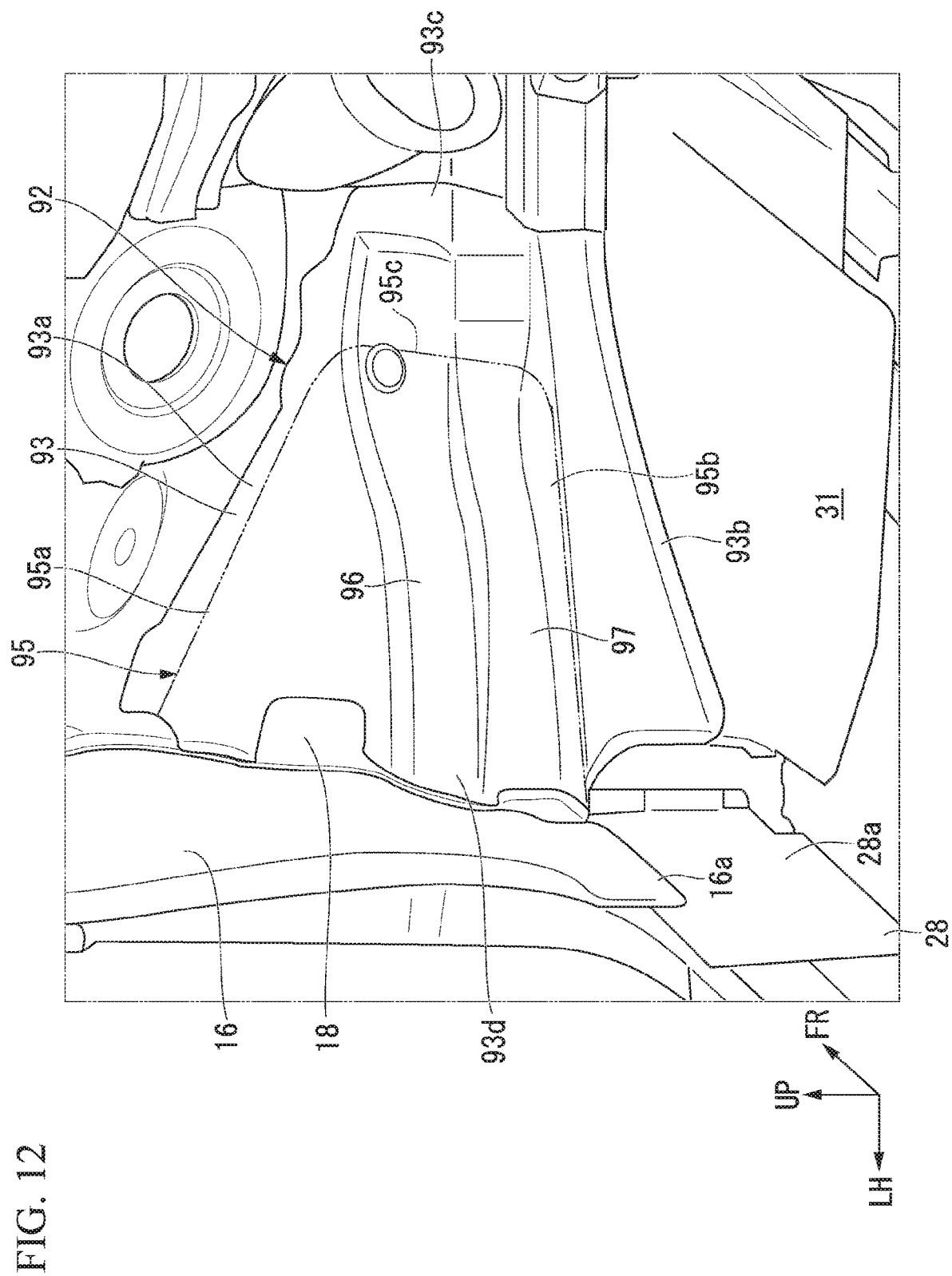
FIG. 12 is an enlarged perspective view showing a portion XII of FIG. 11 according to the embodiment of the present invention.

As shown in FIGS. 3 and 12, the dash lower reinforcing panel 92 is formed in a quadrangular shape by outer sides 93 including an upper side 93a, a lower side 93b, an inner side 93c, and an outer side 93d. The dash lower reinforcing panel 92 includes a panel curved portion 95, a first panel member 96, and a second panel member 97.

The panel curved portion 95 is formed to cover the wheel house rear portion 42 from the passenger compartment 31 side. That is, the panel curved portion 95 is formed in a curved shape to bulge toward the passenger compartment 31 along the wheel house rear portion 42.

The panel curved portion 95 has a curved upper edge portion 95a, a curved lower edge portion 95b, and a curved inner edge portion 95c.

The curved upper edge portion 95a is formed along the upper edge portion 42a of the wheel house rear portion 42. The curved lower edge portion 95b is formed along the lower edge portion 42b of the wheel house rear portion 42. The curved inner edge portion 95c is formed along the inner edge portion 42c of the wheel house rear portion 42.

The first panel member 96 extends from a vertical center of the outer side 93d of the dash lower reinforcing panel 92 to an upper portion of the inner side 93c in the vehicle width direction. The second panel member 97 extends along the lower side 93b from a lower portion of the outer side 93d of the dash lower reinforcing panel 92 to a lower portion of the inner side 93c in the vehicle width direction.

The dash lower reinforcing panel 92 is reinforced by the first panel member 96 and the second panel member 97.

In the dash lower reinforcing panel 92, the upper side 93a, the lower side 93b, the inner side 93c, and the outer side 93d are joined to the dash lower 18 by spot welding, for example. The outer side 93d of the dash lower reinforcing panel 92 is adjacent to the front pillar 16.

Figure 13:
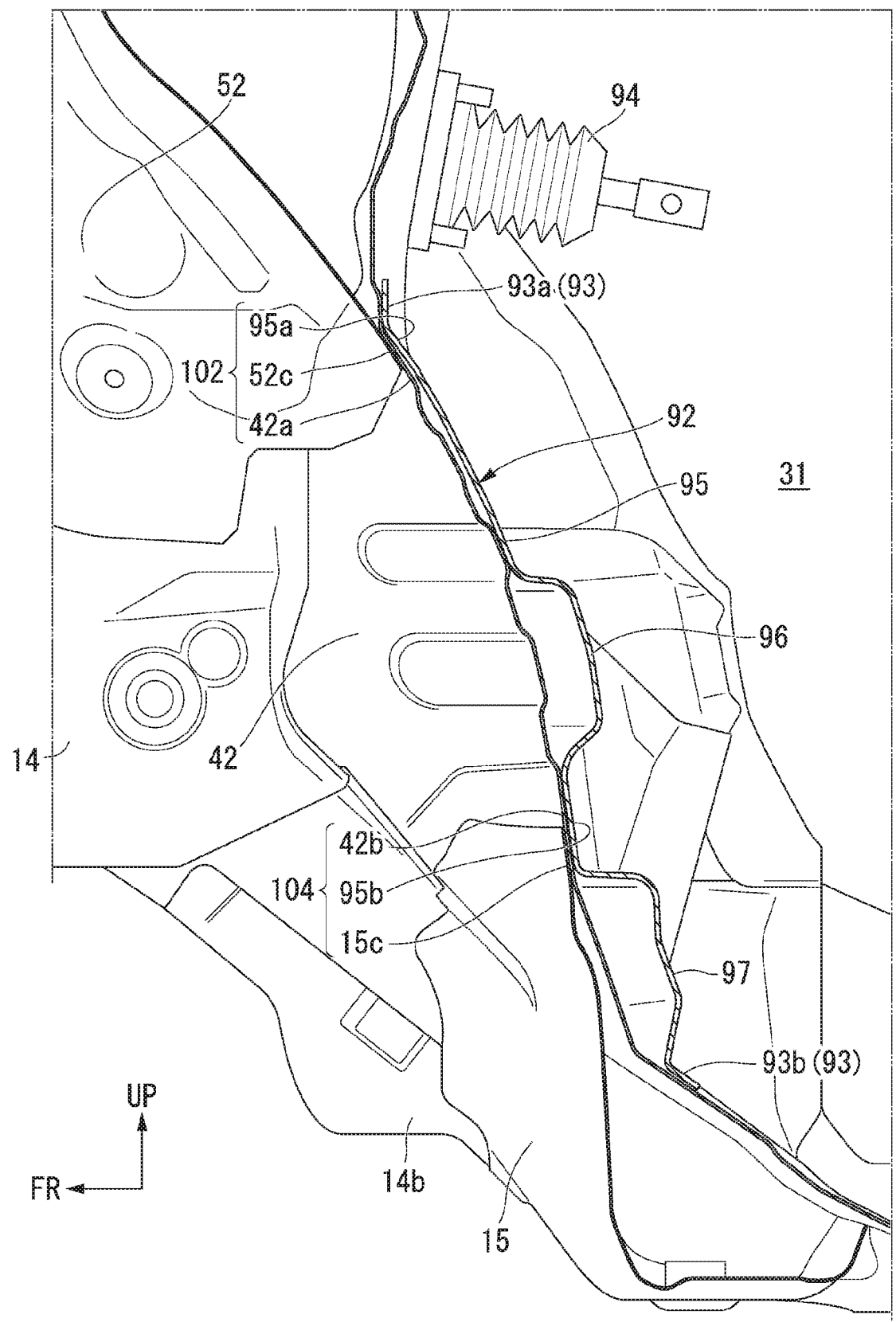
FIG. 13 is a side view showing a state when cut away along line XIII-XIII of FIG. 11 according to the embodiment of the present invention.

As shown in FIGS. 3 and 13, for example, spot welding is performed in a state in which three portions including the rear edge portion 52c of the damper housing 52, the upper edge portion 42a of the wheel house rear portion 42, and the curved upper edge portion 95a of the dash lower reinforcing panel 92 overlap each other.

A first joining portion 102 is formed by a joining portion in which three portions including the rear edge portions 52c, the upper edge portion 42a, and the curved upper edge portion 95a overlap each other.

The first joining portion 102 is formed in a portion having high rigidity by the three portions including the rear edge portions 52c, the upper edge portion 42a, and the curved upper edge portion 95a overlapping each other. Therefore, the impact load F1 input to the front side frame 14 from in front of the vehicle Ve can be efficiently transmitted from the damper housing 52 to the first joining portion 102.

Figure 14:
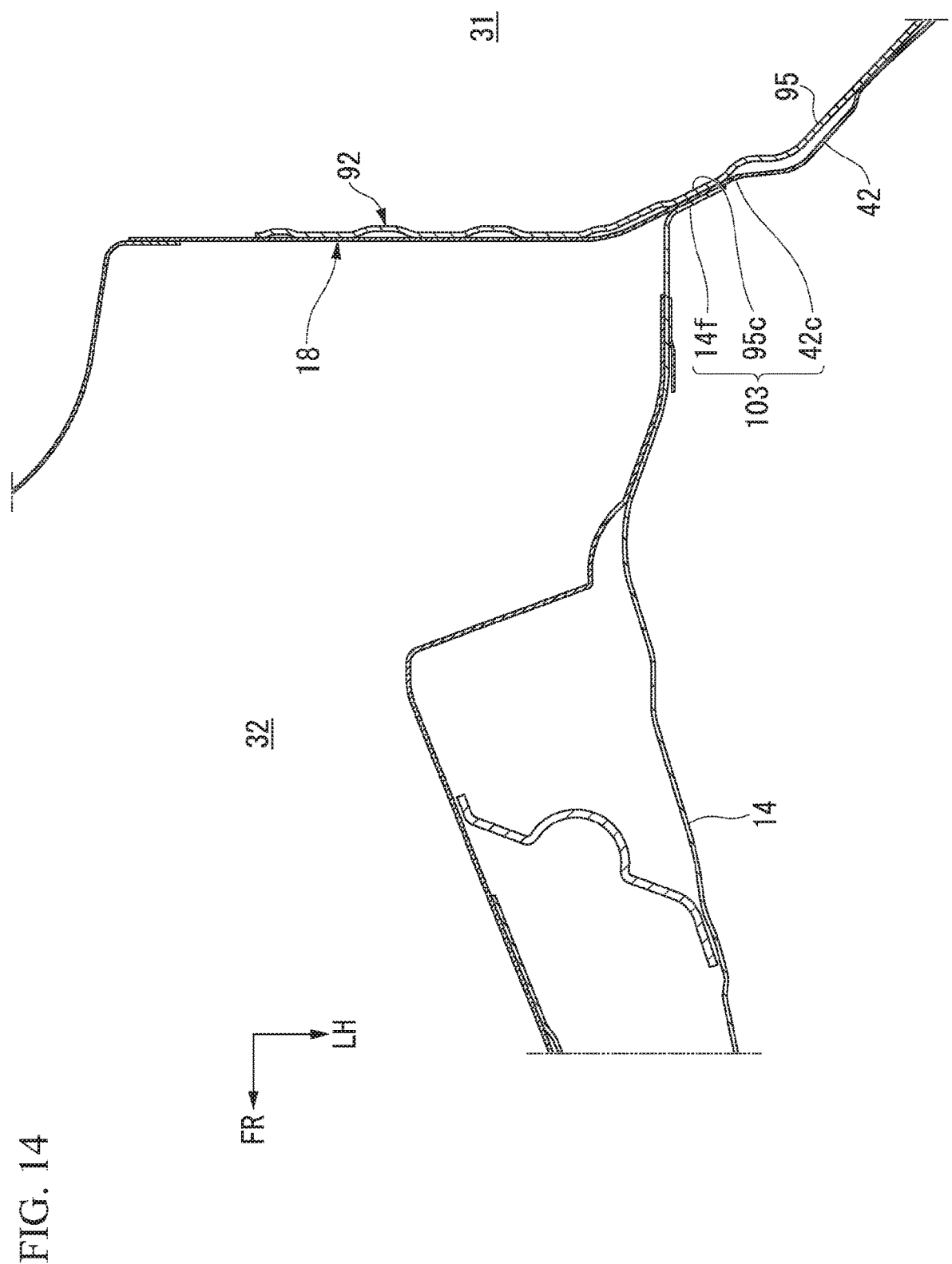
FIG. 14 is a side view showing a state when cut away along line XIIII-XIIII of FIG. 3 according to the embodiment of the present invention.

As shown in FIGS. 3 and 14, for example, spot welding is performed in a state in which three portions including a frame rear edge portion 14f of the front side frame 14, the inner edge portion 42c of the wheel house rear portion 42, and the curved inner edge portion 95c of the dash lower reinforcing panel 92 overlap each other. A second joining portion 103 is formed by a joining portion in which three portions including the frame rear edge portion 14f, the inner edge portion 42c, and the curved inner edge portion 95c overlap each other.

The second joining portion 103 is formed in a portion having high rigidity by the three portions including the frame rear edge portion 14f, the inner edge portion 42c, and the curved inner edge portion 95c overlapping each other. Therefore, the impact load F1 input to the front side frame 14 from in front of the vehicle Ve can be efficiently transmitted from the front side frame 14 to the second joining portion 103.

Returning to FIGS. 3 and 13, for example, spot welding is performed in a state in which three portions including the outrigger upper edge portion 15c of the outrigger 15, the lower edge portion 42b of the wheel house rear portion 42, and the curved lower edge portion 95b of the dash lower reinforcing panel 92 overlap each other. A third joining portion 104 is formed by a joining portion in which three portions including the outrigger upper edge portion 15c, the lower edge portion 42b, and the curved lower edge portion 95b overlap each other.

The third joining portion 104 is formed in a portion having high rigidity by the three portions including the outrigger upper edge portion 15c, the lower edge portion 42b, and the curved lower edge portion 95b overlapping each other. Therefore, the impact load F1 input to the front side frame 14 from in front of the vehicle Ve can be efficiently transmitted from the outrigger 15 to the third joining portion 104.

A U-shaped joining portion 101 which is open outward in the vehicle width direction in a U shape is formed by the first joining portion 102, the second joining portion 103, and the third joining portion 104. That is, the U-shaped joining portion 101 is a portion having high rigidity and capable of efficiently transmitting a load.

Therefore, the load can be efficiently transmitted from the front side frame 14, the damper housing 52, and the outrigger 15 to the U-shaped joining portion 101.

Further, the rear edge portion 52c of the damper housing 52 is connected to the front pillar 16 via the upper edge portion 42a (that is, the dash lower 18) of the wheel house rear portion 42. Furthermore, an outer end portion of the dash lower 18 is connected to the front pillar 16 via the front end portion 28a of the side sill 28.

Therefore, the first joining portion 102 and the third joining portion 104 of the U-shaped joining portion 101 are located in the vicinity of the front pillar 16.

Here, the load is efficiently transmitted from the front side frame 14, the damper housing 52, and the outrigger 15 to the U-shaped joining portion 101. In addition, the load transmitted to the U-shaped joining portion 101 is efficiently transmitted to the front pillar 16 through the first joining portion 102 and the third joining portion 104.

Therefore, as shown in FIG. 2, the impact load F1 input to the front side frame 14 from in front of the vehicle Ve is supported by the front pillar 16. Thus, when the impact load F1 is input from in front of the vehicle Ve, the front side frame 14 can be stabilized in the three-point folding mode of the first folding portion 24, the second folding portion 25, and the third folding portion 26.

Next, an example in which the impact energy is sufficiently absorbed by the front side frame 14 when an impact load F3 is input from in front of the vehicle Ve will be described with reference to FIGS. 15 and 16.

Figure 15A:
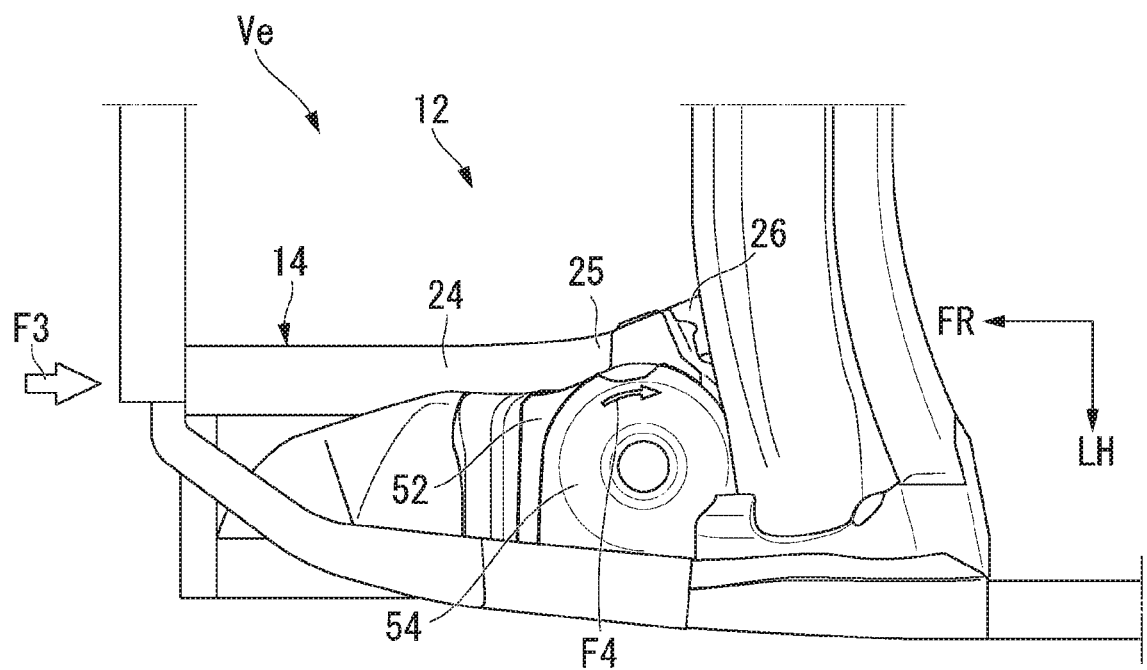
FIG. 15A is a plan view for explaining an example in which an impact load is input to the front side frame from in front of the vehicle according to the embodiment of the present invention.

As shown in FIG. 15A, the impact load F3 is input to the front side frame 14 from in front of the vehicle Ve. A compressive force F4 acts on the damper housing 52 from the front side frame 14 by inputting the impact load F3 to the front side frame 14.

Figure 15B:
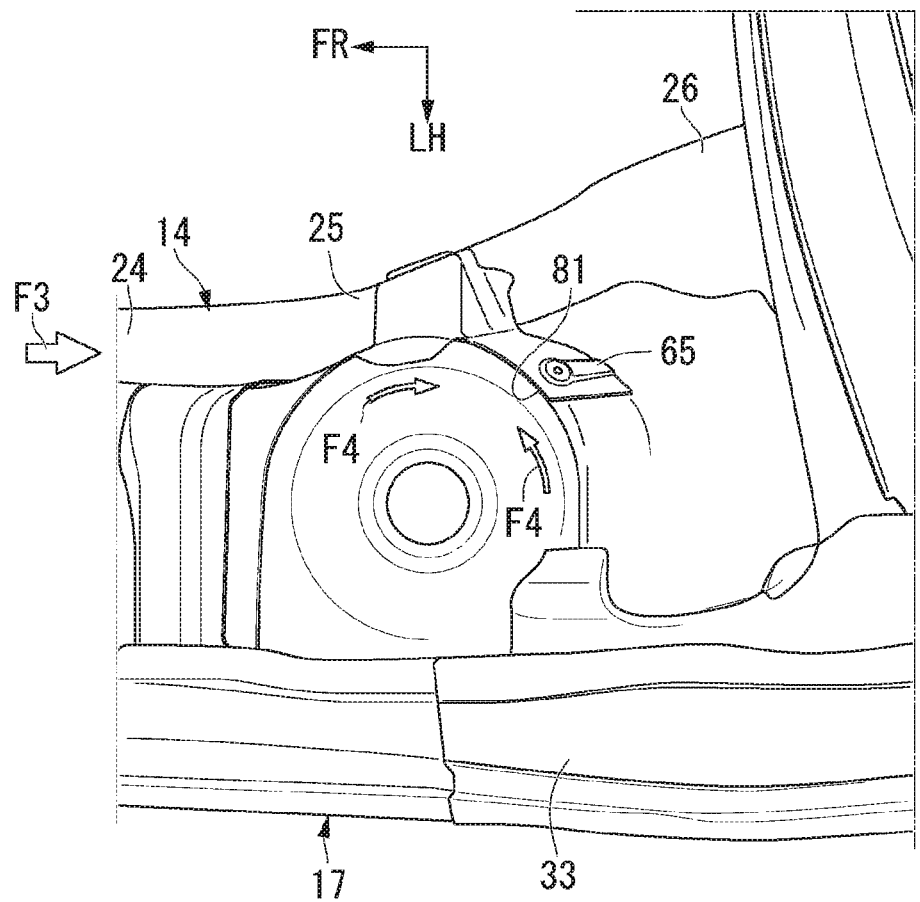
FIG. 15B is a plan view for explaining an example in which a compressive force acts on a compressing portion of the damper housing according to the embodiment of the present invention.

As shown in FIG. 15B, the damper base 54 is rotated in a direction of an arrow by the compressive force F4 acting on the damper housing 52. Therefore, the compressive force F4 acts as a reaction force on the damper housing 52 from the horizontal member 33 of the upper member 17. Thus, a compressive force which tries to crush the compression portion 81 acts on the damper housing 52.

Here, the reinforcing panel 65 is stacked on the compression portion 81. Therefore, the compression portion 81 is reinforced by the reinforcing panel 65. That is, the deformation of the compression portion 81 due to the compressive force can be curbed by the reinforcing panel 65. Thus, the impact load F3 can be sufficiently applied to the first folding portion 24, and the deformation of the first folding portion 24 can be promoted.

Figure 16A:
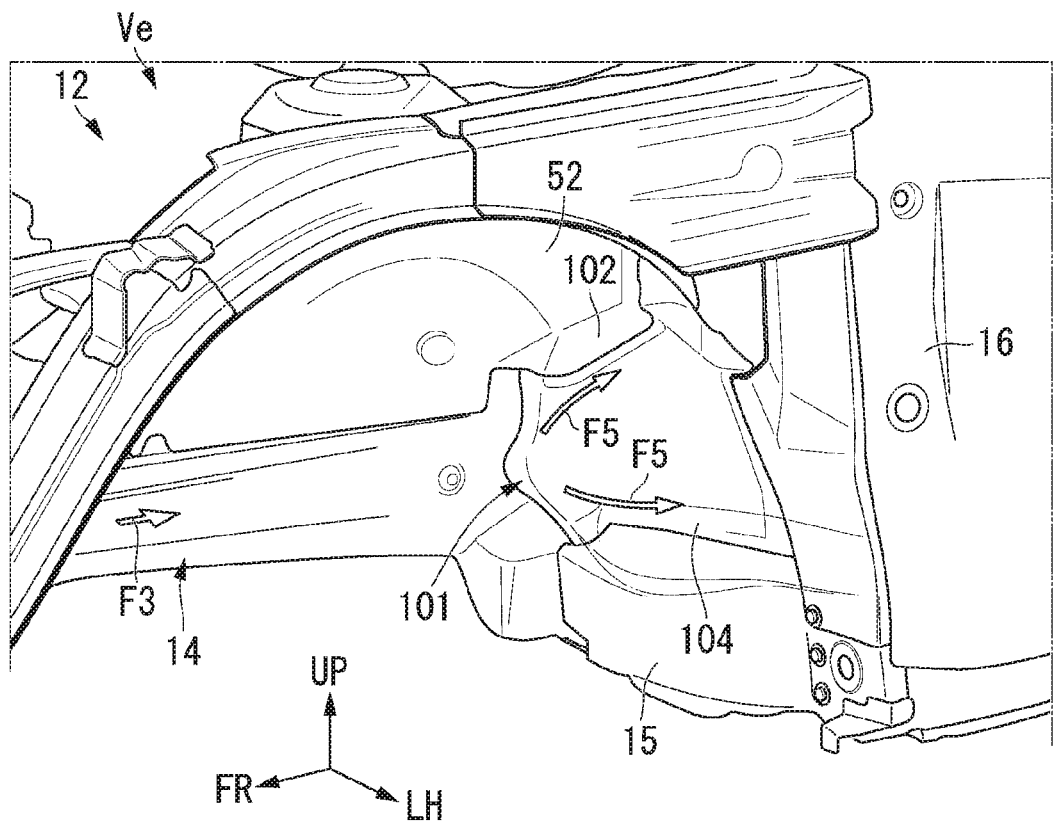
FIG. 16A is a perspective view for explaining an example in which an impact load input to the front side frame is transmitted to a front pillar according to the embodiment of the present invention.

As shown in FIG. 16A, the impact load F3 input to the front side frame 14 from in front of the vehicle Ve is efficiently transmitted from the front side frame 14, the damper housing 52, and the outrigger 15 to the U-shaped joining portion 101. Furthermore, the load transmitted to the U-shaped joining portion 101 is efficiently transmitted as a load F5 to the front pillar 16 via the first joining portion 102 and the third joining portion 104.

Therefore, the impact load F3 input to the front side frame 14 from in front of the vehicle Ve is supported by the front pillar 16.

Figure 16B:
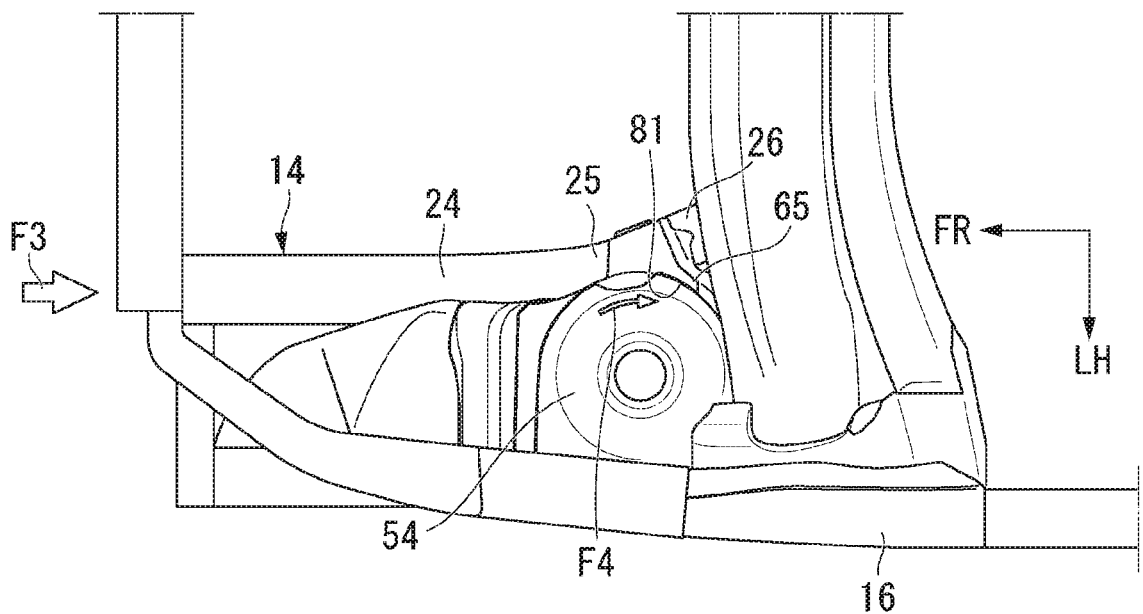
FIG. 16B is a plan view for explaining an example in which impact energy is absorbed by the front side frame according to the embodiment of the present invention.

As shown in FIG. 16B, when the compressive force F4 is applied to the compression portion 81 with the impact load F3 from in front of the vehicle Ve, the deformation of the compression portion 81 can be curbed by the reinforcing panel 65, and the impact load F3 can be supported by the front pillar 16.

Therefore, the impact load F3 can be sufficiently applied to the first folding portion 24, and the deformation of the first folding portion 24 can be promoted.

Further, it is possible to favorably adjust the load which deforms the compression portion 81 by adjusting the shape of the first vertical bead 87 and the shape of the second vertical bead 88. The second folding portion 25 and the third folding portion 26 can be favorably deformed in synchronization with the first folding portion 24.

Therefore, with the impact load F3 input from in front of the vehicle Ve, the front side frame 14 can be stabilized in the three-point folding mode of the first folding portion 24, the second folding portion 25, and the third folding portion 26. That is, the front side frame 14 can be appropriately folded at the first folding portion 24, the second folding portion 25, and the third folding portion 26. Thus, the amount of absorption of the impact energy by the front side frame 14 can be sufficiently secured.

Modified Example

In the first embodiment, although the example in which the first vertical bead 87 is formed on the reinforcing panel 65 and also the second vertical bead 88 is formed on the damper housing 52 has been described, the present invention is not limited thereto. As another example, only the first vertical bead 87 can be formed on the reinforcing panel 65.

Also in this case, it is possible to favorably adjust the load which deforms the compression portion 81 by adjusting the shape of the first vertical bead 87. Thus, the second folding portion 25 and the third folding portion 26 can be favorably deformed in synchronization with the first folding portion 24 by adjusting the shape of the first vertical bead 87.

Therefore, when an impact load is input from in front of the vehicle Ve, the front side frame 14 can be stabilized in the three-point folding mode of the first folding portion 24, the second folding portion 25, and the third folding portion 26. That is, the front side frame 14 can be appropriately folded at the first folding portion 24, the second folding portion 25, and the third folding portion 26. Thus, the amount of absorption of the impact energy by the front side frame 14 can be sufficiently secured.

Further, the first vertical bead 87 is formed on the reinforcing panel 65. Therefore, the rigidity of the damper housing 52 in the vertical direction of the vehicle body can be increased with the first vertical beads 87 by stacking the reinforcing panel 65 on the compression portion 81. That is, the rigidity of the damper housing 52 in the vertical direction of the vehicle body is enhanced by the first vertical bead 87. Thus, the damper is appropriately held by the damper housing 52, and it is possible to contribute to the running stability of the vehicle Ve.

The technical scope of the present invention is not limited to the above-described embodiments, and various modifications can be made without departing from the spirit of the present invention.

For example, in the above-described embodiment, although the example in which the first folding portion 24, the second folding portion 25, and the third folding portion 26 are provided in the front side frame 14 has been described, the present invention is not limited thereto. As another example, it is possible to provide three or more folding portions.

Moreover, in the above-described embodiment, although the example in which the reinforcing member 64 and the reinforcing panel 65 are continuously formed by integrally forming the reinforcing member 64 and the reinforcing panel 65 has been described, the present invention is not limited thereto. As another example, for example, the reinforcing member 64 and the reinforcing panel 65 may be formed as separate members, and the reinforcing member 64 and the reinforcing panel 65 may be provided in a continuous state.

Furthermore, in the above-described embodiment, although the example in which the side wall member is the damper housing 52 has been described, the present invention is not limited thereto. As another example, for example, a wheel house or the like can be used as the side wall member.

Moreover, in the above-described embodiment, although the example in which the first vertical bead 87 and the second vertical bead 88 are formed to extend in the vertical direction has been described, the present invention is not limited thereto. As another example, the first vertical bead 87 and the second vertical bead 88 may extend obliquely.

BRIEF DESCRIPTION OF THE REFERENCE SYMBOLS

10: Vehicle body
12: Vehicle body front structure
14: Front side frame
14a: Rear frame portion
15: Outrigger
18: Dash lower
18b: Upper portion of dash lower
19: Dash upper
24: First folding portion
25: Second folding portion
26: Third folding portion
28: Side sill
31: Passenger compartment
32: Engine compartment
44: Upper front wall (front wall)
45: Upper rear wall (rear wall)
46: Upper bottom portion (bottom portion)
47: Upper inclined portion
48: First corner portion (corner portion)
49: Second corner portion (corner portion)
52: Damper housing (side wall member)
64: Reinforcing member
65: Reinforcing panel
66: Peripheral edge portion
74: Front joining flange (joining flange)
75: Rear joining flange (joining flange)
76: Upper joining flange
77: Lower joining flange
81: Compression portion
84: Raised portion
85: Joining recess portion
87: First vertical bead (vertical bead)
88: Second vertical bead
92: Dash lower reinforcing panel
101: U-shaped joining portion
102: First joining portion
103: Second joining portion
104: Third joining portion
F1, F3: Impact load
F2, F4: Compressive force
Ve: Vehicle

What is claim is:

1. A vehicle body front structure comprising:
a front side frame which extends in a forward and rearward direction of a vehicle body;
a side wall member which is provided outside the front side frame in a vehicle width direction and joined to the front side frame, and
a reinforcing member provided on the side wall member in a state in which it is continuous with a reinforcing panel,
wherein the front side frame has at least three folding portions, which include a first folding portion, a second folding portion, and a third folding portion capable of being bent by an impact load input from in front of a vehicle, in this order at intervals from a front toward a rear of the vehicle body, and has the reinforcing panel which is provided between the second folding portion and the third folding portion among the side wall members, is stacked on a compression portion on which a compressive force acts from the impact load, and has a vertical bead, and
wherein the reinforcing member is provided in the vicinity of the second folding portion to reinforce the second folding portion in a vertical direction of the vehicle body.

2. The vehicle body front structure according to claim 1, wherein:
the reinforcing member has a joining flange which is joined to the side wall member, and
the reinforcing panel includes a raised portion which is raised in a direction away from the side wall member with respect to the joining flange of the reinforcing member and has the vertical bead, and a joining recess portion which is formed in a concave shape from a peripheral edge portion of the raised portion to the side wall member and joined to the side wall member.

3. The vehicle body front structure according to claim 2, wherein:
the side wall member is a damper housing, and
the damper housing has a second vertical bead which is formed on the compression portion along the vertical bead of the reinforcing panel.

4. The vehicle body front structure according to claim 3, further comprising:

a dash lower which is coupled to the damper housing and the front side frame and partitions an engine compartment from a passenger compartment;

a dash lower reinforcing panel which is joined to the dash lower from a passenger compartment side and reinforces the dash lower;

an outrigger which is connected to the front side frame and extends to a side sill toward an outside in the vehicle width direction;

a first joining portion in which three portions including the damper housing, the dash lower, and the dash lower reinforcing panel are joined while overlapping each other;

a second joining portion in which three portions including the front side frame, the dash lower, and the dash lower reinforcing panel are joined while overlapping each other; and a third joining portion in which three portions including the outrigger, the dash lower, and the dash lower reinforcing panel are joined while overlapping each other, wherein a U-shaped joining portion which is open in a U-shape outward in the vehicle width direction is formed by the first joining portion, the second joining portion, and the third joining portion.

5. The vehicle body front structure according to claim 4, further comprising a dash upper which is provided on an upper portion of the dash lower and has a U-shaped cross section which is open upward from a front wall, a rear wall, and a bottom portion, wherein the damper housing is joined to the front wall and the bottom portion of the dash upper over at least two or more corner portions.

6. The vehicle body front structure according to claim 1, wherein:

the side wall member is a damper housing, and the damper housing has a second vertical bead which is formed on the compression portion along the vertical bead of the reinforcing panel.

7. The vehicle body front structure according to claim 6, further comprising:

a dash lower which is coupled to the damper housing and the front side frame and partitions an engine compartment from a passenger compartment;

a dash lower reinforcing panel which is joined to the dash lower from a passenger compartment side and reinforces the dash lower;

an outrigger which is connected to the front side frame and extends to a side sill toward an outside in the vehicle width direction;

a first joining portion in which three portions including the damper housing, the dash lower, and the dash lower reinforcing panel are joined while overlapping each other;

a second joining portion in which three portions including the front side frame, the dash lower, and the dash lower reinforcing panel are joined while overlapping each other; and a third joining portion in which three portions including the outrigger, the dash lower, and the dash lower reinforcing panel are joined while overlapping each other, wherein a U-shaped joining portion which is open in a U-shape outward in the vehicle width direction is formed by the first joining portion, the second joining portion, and the third joining portion.

8. The vehicle body front structure according to claim 7, further comprising a dash upper which is provided on an upper portion of the dash lower and has a U-shaped cross section which is open upward from a front wall, a rear wall, and a bottom portion, wherein the damper housing is joined to the front wall and the bottom portion of the dash upper over at least two or more corner portions.

9. The vehicle body front structure according to claim 1, wherein:

the side wall member is a damper housing, and the damper housing has a second vertical bead which is formed on the compression portion along the vertical bead of the reinforcing panel.

10. The vehicle body front structure according to claim 9, further comprising:

a dash lower which is coupled to the damper housing and the front side frame and partitions an engine compartment from a passenger compartment;

a dash lower reinforcing panel which is joined to the dash lower from a passenger compartment side and reinforces the dash lower;

an outrigger which is connected to the front side frame and extends to a side sill toward an outside in the vehicle width direction;

a first joining portion in which three portions including the damper housing, the dash lower, and the dash lower reinforcing panel are joined while overlapping each other;

a second joining portion in which three portions including the front side frame, the dash lower, and the dash lower reinforcing panel are joined while overlapping each other; and a third joining portion in which three portions including the outrigger, the dash lower, and the dash lower reinforcing panel are joined while overlapping each other, wherein a U-shaped joining portion which is open in a U-shape outward in the vehicle width direction is formed by the first joining portion, the second joining portion, and the third joining portion.

11. The vehicle body front structure according to claim 10, further comprising a dash upper which is provided on an upper portion of the dash lower and has a U-shaped cross section which is open upward from a front wall, a rear wall, and a bottom portion, wherein the damper housing is joined to the front wall and the bottom portion of the dash upper over at least two or more corner portions.

* * * * *